US00RE48781E

(19) United States
(12) Reissued Patent
Arnold et al.

(10) Patent Number: US RE48,781 E
(45) Date of Reissued Patent: Oct. 19, 2021

(54) VEHICULAR TRAFFIC SENSOR

(71) Applicant: WAVETRONIX LLC., Provo, UT (US)

(72) Inventors: David V. Arnold, Provo, UT (US); Logan C. Harris, Lindon, UT (US); Michael A. Jensen, Lindon, UT (US); Thomas William Karlinsey, Orem, UT (US); Ryan L. Smith, Salem, UT (US); Jonathan L. Waite, Orem, UT (US); John B. Dougall, Highland, UT (US)

(73) Assignee: WAVETRONIX LLC, Provo, UT (US)

(21) Appl. No.: 15/487,228

(22) Filed: Apr. 13, 2017

Related U.S. Patent Documents

Reissue of:
(64) Patent No.: 6,693,557
Issued: Feb. 17, 2004
Appl. No.: 09/964,668
Filed: Sep. 27, 2001

(51) Int. Cl.
*H01Q 13/10* (2006.01)
*H01Q 21/00* (2006.01)
(Continued)

(52) U.S. Cl.
CPC ..... *H01Q 21/0006* (2013.01); *G01S 13/04* (2013.01); *G08G 1/042* (2013.01);
(Continued)

(58) Field of Classification Search
CPC ..... G01S 13/04; G01S 7/032; G01S 7/352; G01S 13/34; G08G 1/042; H01Q 13/106; H01Q 21/0006; H01Q 21/08
(Continued)

(56) References Cited

U.S. PATENT DOCUMENTS 3,646,246 A 2/1972 Olney
3,727,218 A 4/1973 Cantwell, Jr. et al.
(Continued)

FOREIGN PATENT DOCUMENTS

CA 2512689 7/2004
DE 3414159 10/1985
(Continued)

OTHER PUBLICATIONS

Madjar et al. "A novel DDS based 94 GHz high linearity FMCW RF front end, 26th EuMC" Sep. 9-12, 1996.
(Continued)

*Primary Examiner* — Ovidio Escalante
(74) *Attorney, Agent, or Firm* — Workman Nydegger

(57) ABSTRACT

A vehicle traffic sensor for detecting and monitoring vehicular targets is presented. The sensor employs a planar design resulting in a reduced profile sensor. The sensor includes a multi-layer radio frequency board with RF components on one of the sides and both isolation and planar array antennas on the opposing side. The antennas are preferably tapered planar array antennas which include one transmit antenna and one receive antenna. The sensor also includes at least one logic or signal processing board populated with components on a first side and a ground plane on a second side positioned toward the RF componentry of the RF board to form an RF shield. The boards are housed within a housing that is permeable, at least on the side through which the antenna structures propagate.

72 Claims, 15 Drawing Sheets

NEW

(51) Int. Cl.

| | |
|---|---|
| ***H01Q 21/08*** | (2006.01) |
| ***G08G 1/042*** | (2006.01) |
| ***G01S 13/04*** | (2006.01) |
| ***G01S 13/00*** | (2006.01) |
| ***G01S 7/03*** | (2006.01) |
| ***G01S 7/35*** | (2006.01) |
| ***G01S 7/02*** | (2006.01) |
| ***G01S 13/34*** | (2006.01) |

(52) U.S. Cl.
CPC ..... *H01Q 13/106* (2013.01); *H01Q 21/08* (2013.01); *G01S 7/032* (2013.01); *G01S 7/352* (2013.01); *G01S 13/34* (2013.01)

(58) Field of Classification Search
USPC ..... 340/933, 928; 342/385, 448, 450, 45; 343/720, 824, 872
See application file for complete search history.

(56) References Cited

U.S. PATENT DOCUMENTS 3,737,857 A 6/1973 Carman
3,819,919 A 6/1974 McGunigle
3,868,685 A 2/1975 Wilmot
4,053,741 A 10/1977 Ainoya
4,167,330 A 9/1979 Haville
4,180,817 A * 12/1979 Sanford ..... H01Q 13/206 342/375
4,244,026 A 1/1981 Dickey
4,258,351 A 3/1981 Shigeta
4,317,117 A 2/1982 Chasek
RE31,044 E 9/1982 McReynolds et al.
4,370,718 A 1/1983 Chasek
4,430,636 A 2/1984 Bruce
4,658,334 A * 4/1987 McSparran et al. ..... 361/415
4,659,982 A 4/1987 Van de Velde
4,674,073 A 6/1987 Naruse
4,679,046 A * 7/1987 Curtis ..... G08B 13/2474 342/51
4,700,191 A 10/1987 Mano
4,814,765 A 3/1989 Deroche
4,851,855 A * 7/1989 Tsukamoto et al. ..... 343/873
4,866,438 A 9/1989 Knisch
4,908,615 A * 3/1990 Bayraktaroglu ..... 340/933
4,914,448 A * 4/1990 Otsuka et al. ..... 343/872
4,914,449 A * 4/1990 Fukuzawa et al. ..... 343/872
4,967,201 A * 10/1990 Rich, III ..... 341/175
4,977,406 A * 12/1990 Tsukamoto et al. ..... 343/846
4,985,705 A 1/1991 Stammler
5,008,678 A 4/1991 Herman
5,023,551 A 6/1991 Kleinberg et al.
5,066,950 A 11/1991 Schweitzer
5,103,234 A * 4/1992 Watkins ..... G01V 15/00 340/572.7
5,122,961 A 6/1992 Toyama
5,161,107 A 11/1992 Mayeaux
5,204,682 A 4/1993 Beasley
5,243,528 A 9/1993 Lefebvre
5,262,783 A * 11/1993 Philpott et al. ..... G01S 7/032 342/114
5,278,554 A 1/1994 Marton
5,278,563 A 1/1994 Spiess
5,339,081 A 8/1994 Jefferis
5,402,346 A 3/1995 Lion
5,423,080 A * 6/1995 Perret et al. ..... 455/90
5,446,395 A 8/1995 Goto
5,448,484 A 9/1995 Bulllock
5,504,490 A 4/1996 Brendle
5,504,659 A 4/1996 Acatay
5,506,584 A 4/1996 Boles
5,510,990 A 4/1996 Hibino
5,555,036 A 9/1996 Harnett
5,572,450 A 11/1996 Worthy
5,581,249 A 12/1996 Yoshida
5,621,645 A 4/1997 Brady
5,663,720 A 9/1997 Weissman
5,668,739 A 9/1997 League
5,694,134 A 12/1997 Barnes
5,710,565 A 1/1998 Shirai
5,714,965 A 2/1998 Taguchi
5,716,301 A 2/1998 Wild
5,721,194 A 2/1998 Yandrofski
5,748,153 A 5/1998 McKinzie
5,757,307 A 5/1998 Nakatani
5,790,403 A 8/1998 Nakayama
5,793,309 A 8/1998 Nellson
5,793,491 A 8/1998 Wangler
5,798,983 A * 8/1998 Kuhn ..... H04B 11/00 367/127
5,821,879 A 10/1998 Liepmann
5,828,339 A 10/1998 Patel
5,862,337 A 1/1999 Gray ..... 395/200
5,878,367 A 3/1999 Lee
5,884,212 A 3/1999 Lion
5,920,280 A 7/1999 Okada
5,923,280 A * 7/1999 Farmer ..... G01S 7/023 342/129
5,926,114 A 7/1999 Andrews
5,929,802 A 7/1999 Russell
5,949,383 A 9/1999 Hayes
5,962,114 A 10/1999 Jonza et al.
5,995,900 A 11/1999 Hsiao
6,008,770 A * 12/1999 Sugawara ..... H01Q 13/085 343/767
6,011,515 A 1/2000 Radcliffe
6,020,856 A * 2/2000 Alicot ..... G08B 13/2471 340/572.7
6,037,894 A 3/2000 Pfizanmaier
6,049,205 A 4/2000 Taicher et al.
6,061,035 A 5/2000 Kinasewitz
6,064,318 A 5/2000 Kirchner
6,081,226 A 6/2000 Caldwell
6,085,151 A 7/2000 Farmer
6,091,355 A * 7/2000 Cadotte, Jr. et al. ..... 342/104
6,094,158 A 7/2000 Williams
6,094,172 A 7/2000 Kascica
6,114,973 A 9/2000 Winner
6,118,405 A 9/2000 McKinnon
6,124,807 A 9/2000 Heckeroth
6,144,973 A 11/2000 Fujii et al.
6,160,494 A 12/2000 Sodi
6,163,252 A 12/2000 Nishiwaki
6,177,885 B1 1/2001 Weil
6,195,019 B1 2/2001 Nagura
6,195,608 B1 2/2001 Berliner
6,198,437 B1 3/2001 Watson
6,204,778 B1 3/2001 Bergan
6,253,162 B1 6/2001 Jarman
6,266,627 B1 7/2001 Gatsonides
6,272,443 B1 8/2001 Motzko
6,340,932 B1 * 1/2002 Rodgers ..... H01Q 7/00 340/572.7
6,366,870 B2 4/2002 Jarman
6,373,427 B1 4/2002 Hohne
6,377,191 B1 4/2002 Takubo
6,396,435 B1 5/2002 Fleischhauer
6,396,437 B1 5/2002 Marino
6,470,262 B2 10/2002 Kerner
6,490,519 B1 12/2002 Lapidot
6,501,436 B1 * 12/2002 Saito ..... H01Q 9/26 343/742
6,556,916 B2 4/2003 Waite
6,556,919 B2 4/2003 Suzuki et al.
6,577,269 B2 6/2003 Woodington
6,614,536 B1 9/2003 Deomens
6,657,554 B1 12/2003 Terashima
6,670,910 B2 12/2003 Delcheccolo
6,683,557 B2 1/2004 Pleva
6,693,557 B2 2/2004 Arnold
6,707,391 B1 3/2004 Monroe
6,707,419 B2 3/2004 Woodington
6,750,787 B2 6/2004 Hutchinson
6,781,523 B2 8/2004 Matsui

(56) References Cited

U.S. PATENT DOCUMENTS

| | | | |
|---|---|---|---|
| 6,812,888 | B2 | 11/2004 | Drury |
| 6,816,107 | B2 | 11/2004 | Pleva |
| 6,856,876 | B2 | 2/2005 | Breed |
| 6,876,949 | B2 | 4/2005 | Hilliard |
| 6,879,281 | B2 | 4/2005 | Gresham |
| 6,888,474 | B2 | 5/2005 | Sharp |
| 6,959,259 | B2 | 10/2005 | Vock |
| 7,089,422 | B2 | 8/2006 | Huntingdon |
| 7,106,073 | B1 | 9/2006 | Bach et al. |
| 7,227,493 | B2 | 6/2007 | Huntingdon et al. |
| 7,317,406 | B2 | 1/2008 | Wolterman |
| 7,324,015 | B1 | 1/2008 | Allen |
| 7,327,280 | B2 | 2/2008 | Bachelder |
| 7,408,479 | B2 | 8/2008 | Johnson |
| 7,421,334 | B2 | 9/2008 | Dahlgren |
| 7,426,450 | B2 | 9/2008 | Arnold |
| 7,427,930 | B2 | 9/2008 | Arnold |
| 7,501,976 | B2 | 3/2009 | Manor |
| 7,550,681 | B2 | 6/2009 | Wang et al. |
| 7,573,400 | B2 | 8/2009 | Arnold |
| 7,821,422 | B2 | 10/2010 | Hutchinson et al. |
| 7,889,097 | B1 | 2/2011 | Arnold |
| 7,889,098 | B1 | 2/2011 | Arnold |
| 7,924,170 | B1 | 4/2011 | Arnold |
| 7,991,542 | B2 | 8/2011 | Giles |
| 8,248,272 | B2 | 8/2012 | Arnold |
| 8,665,113 | B2 | 3/2014 | Arnold |
| 8,666,113 | B2 | 3/2014 | Determan et al. |
| 8,948,995 | B2 | 2/2015 | Pandita et al. |
| 9,240,125 | B2 | 1/2016 | Arnold |
| 9,412,271 | B2 | 8/2016 | Sharma |
| 9,601,014 | B2 | 3/2017 | Arnold et al. |
| 10,276,041 | B2 | 4/2019 | Arnold et al. |
| 2001/0000948 | A1 | 5/2001 | Chen |
| 2001/0045042 | A1 | 11/2001 | Theile |
| 2001/0046042 | A1 | 11/2001 | Theile et al. |
| 2002/0147534 | A1 | 10/2002 | Delcheccolo |
| 2003/0212524 | A1 | 11/2003 | Cote et al. |
| 2004/0083037 | A1 | 4/2004 | Yamane |
| 2004/0119633 | A1 | 6/2004 | Oswald |
| 2004/0174294 | A1 | 9/2004 | Arnold et al. |
| 2004/0227661 | A1 | 11/2004 | Godsy |
| 2005/0046597 | A1 | 3/2005 | Hutchison |
| 2005/0168331 | A1 | 8/2005 | Gunderson |
| 2005/0231384 | A1 | 10/2005 | Shimotani |
| 2005/0242306 | A1 | 11/2005 | Sirota |
| 2006/0082472 | A1 | 4/2006 | Adachi |
| 2006/0152405 | A1 | 7/2006 | Egri |
| 2006/0155427 | A1 | 7/2006 | Yang |
| 2006/0287807 | A1 | 12/2006 | Teffer |
| 2007/0009694 | A1 | 1/2007 | Monk et al. |
| 2007/0016359 | A1 | 1/2007 | Manor |
| 2007/0096943 | A1 | 5/2007 | Arnold |
| 2007/0152869 | A1 | 7/2007 | Woodington |
| 2007/0208495 | A1 | 9/2007 | Chapman |
| 2007/0222639 | A1 | 9/2007 | Giles et al. |
| 2008/0012726 | A1 | 1/2008 | Publicover |
| 2008/0263080 | A1 | 10/2008 | Fukuma et al. |
| 2010/0069093 | A1 | 3/2010 | Morrison |
| 2010/0141479 | A1 | 6/2010 | Arnold et al. |
| 2010/0149020 | A1 | 6/2010 | Arnold et al. |
| 2010/0214126 | A1 | 8/2010 | Publicover |
| 2011/0068950 | A1 | 3/2011 | Flaherty |
| 2013/0013179 | A1 | 1/2013 | Lection et al. |
| 2013/0286198 | A1 | 10/2013 | Fan et al. |
| 2014/0104310 | A1 | 4/2014 | Kandogan |
| 2014/0139361 | A1 | 5/2014 | Arnold et al. |
| 2014/0210645 | A1 | 7/2014 | Sharma |
| 2016/0086485 | A1 | 3/2016 | Arnold et al. |
| 2016/0300487 | A1 | 10/2016 | Arnold |
| 2017/0069203 | A1 | 3/2017 | Sharma |
| 2018/0211525 | A1 | 7/2018 | Arnold et al. |

FOREIGN PATENT DOCUMENTS

| | | | | |
|---|---|---|---|---|
| DE | 4223119 | | 6/1993 | |
| DE | 19530065 | | 1/1997 | |
| DE | 19820704 | | 11/1999 | |
| EP | 129251 | | 12/1984 | |
| EP | 0642190 | | 3/1995 | |
| EP | 0645840 | A1 * | 3/1995 | ..... G08B 13/2474 |
| EP | 0716949 | | 6/1996 | |
| EP | 0940690 | | 3/1998 | |
| EP | 0945715 | | 3/1998 | |
| EP | 0954049 | | 4/1998 | |
| EP | 0978729 | | 8/1998 | |
| EP | 1180758 | | 2/2002 | |
| EP | 1435036 | A2 | 7/2004 | |
| FR | 2812402 | | 2/2002 | |
| GB | 1443701 | | 7/1975 | |
| GB | 1586305 | | 3/1981 | |
| JP | 4084300 | | 3/1992 | |
| JP | 06-162387 | A | 6/1994 | |
| JP | 6263487 | | 6/1994 | |
| JP | 06-263487 | A | 9/1994 | |
| JP | 6162387 | | 3/2004 | |
| WO | 8001782 | | 9/1980 | |
| WO | 1989006808 | | 7/1989 | |
| WO | 1999008128 | | 2/1999 | |
| WO | WO-9929525 | A1 * | 6/1999 | ..... H01Q 1/2241 |
| WO | 2000045462 | | 3/2000 | |
| WO | 0113141 | | 2/2001 | |
| WO | 200113142 | | 2/2001 | |
| WO | 03027986 | | 4/2003 | |
| WO | 2003027985 | | 4/2003 | |
| WO | 2004063682 | | 7/2004 | |
| WO | 2007053350 | | 5/2007 | |
| WO | 2007112284 | | 10/2007 | |
| WO | 2007115218 | | 10/2007 | |
| WO | 2010103504 | | 9/2010 | |
| WO | 2010144349 | | 12/2010 | |
| WO | 2010144353 | | 12/2010 | |

OTHER PUBLICATIONS

Galani "An Overview of Frequency Synthesizers for Radars" IEEE Transactions on Microwave Theory and Techniques, vol. 39, No. 5, May 1991.

"A Technical Tutorial on Digital Signal Synthesis" Analog Devices, Inc., Copyright 1999.

Institution of Inter Partes Review 37 C.F.R. 42.108 for case IPR2016-00488 entered on Jul. 18, 2016.

Chang, "RF and Microwave Wireless Systems" 2000 John Wiley & Sons, Inc. ISBNs: 0-471-35199-7.

"Duraline Introduces Roadway Lighting Break-Away Systems," *Industry News*, Aug. 9, 2002, available at http://news.thomasnet.com/fullstory/roadway-lighting-disconnects-if-knocked-over-13184.

Able, K.P., "A Radar Study of the Altitude of Nocturnal Passerine Migration," *Bird-Banding*, vol. 41, No. 4, Oct. 1970, 9 pages.

*Applied Concepts, Inc.*, "Stalker Lidar Operator Manual," Copyright 2000.

Beard, Jeffrey C., Arnold, David V., "6GHz Range Finder Using Pulse Compression," *IGARSS* 2000 (Hawaii).

Berka, S. et al., "New Perspectives for ATMS: Advanced Technologies in Traffic Detection," *Journal of Transportation Engineering*, Jan./Feb. 1998, 7 pages.

Brennan, Thomas M., et al, "Visual Education Tools to Illustrate Coordination System Operation" *TRB 2011 Annual Meeting*, Nov. 15, 2010, 29 pages.

Calosso et al. "Phase Noise and Amplitude Noise in DDS" Frequency Control Symposium (FCS), 2012 IEEE International.

*Canadian Driver*, "Automatic Collision Avoidance System Unveiled," Jun. 12, 2002, http://www.canadiandriver.com/news/020612.htm, 3 pages.

Carlson, Brian, "Autoscope Clearing the Congestion: Vision Makes Traffic Control Intelligent" *Advanced Imaging*, Feb. 1997 5 pgs.

(56) References Cited

OTHER PUBLICATIONS

Chang "RF and Microwave Wireless System" John Wiley and Sons, Inc. ISBN: 0-471-35199-7. 2000.
"Circuit Board" Definition by Microsoft Press Computer Dictionary, Third Edition, 1997.
"Circuit Board" Definition by Authoritative Dictionary of IEEE Standard Terms, 2000.
Code of Federal Regulations (CFR 15.245) "Telecommunication" Oct. 1, 2001.
Code of Federal Regulations (CFR 15.205) "Telecommunication" Oct. 1, 2001.
Code of Federal Regulations (CFR 15.255) "Telecommunication" Oct. 1, 2001.
Code of Federal Regulations (CFR 15.253) "Telecommunication" Oct. 1, 2001.
Dailey, "A Statistical Algorithm for Estimating Speed from Single Loop Volume and Occupancy Measurements," Transportation Research Part B 33 (1999) p. 313-322.
Day et al., "Visualization and Assessment of Arterial Progression Quality Using High Resolution Signal Event Data and Measured Travel Time," Mar. 5, 2010, Purdue University, 31 pages.
Day, Christopher M., et al., "Computational Efficiency of Alternative Arterial Offset Optimization Algorithms" *TRB 2011 Annual Meeting*, Nov. 15, 2010, 31 pages.
Day, Christopher M., et al., "Reliability, Flexibility, and Environmental Impact of Alternative Arterial Offset Optimization Objective Functions" *TRB 2011 Annual Meeting*, Nov. 15, 2010, 32 pages.
Derneryd, Anders G., "Linearly Polarized Microstrip Antennas," *IEEE Transactions of Antennas and Propagation*, Nov. 1976, pp. 846-851.
Detection Technology for IVHS: 2. Synopsis of Final Report (1996) https://www.fhwa.dot.gov/publications/research/operations/ivhs/chapter2.cfm.
*Detection Technology: For IVHS*—vol. 1: "Final Report Addendum," Publication No. FHWA-RD-96-100, Jul. 1995, 8 pages.
"Detection Technology for IVHS: vol. 1: Final Report", U.S. Dept. of Transportation, Dec. 1996.
Detector User Needs from the Traffic Signals Workshop Held in Seattle, WA. circa Jul. 2003, 42 pages.
Diker, Ahmet Can, et al. "Estimation of Traffic Congestion Level via FN-DBSCAN Algorithm by Using GPS Data," IV International Conference, PCI'2012, 2012, retrieved on [Jun. 5, 2014]. Retrieved from internet: <URL:http://www.pci2012:science.az/1/19.pdf> entire document.
*Econolite Control Products, Inc.* "Autoscope Automates 100% of Video Detection Set-Up: Introducing the Autoscope Wizard" Nov. 1, 2003, 2 pages.
*Econolite Control Products, Inc.* "Autoscope Solo Pro II Machine Vision Processor" 2003, 2 pgs.
*EIS Electronic Integrated Systems, Inc*, "RTMS Radar Traffic Detection—General Information," pp. 1-6, Available at least as early as Jul. 21, 2001.
*EIS Electronic Integrated Systems, Inc*, "RTMS Radar Traffic Detection—Traffic Detector Primer," pp. 1-4, Available at least as early as Jul. 21, 2001.
*EIS Electronic Integrated Systems, Inc.*, "RTMS User Manual," Issue 3, Sep. 2000.
*Electronique Controle Mesure*, "Loren Multi-Lane Microwave Detector," Available at least as early as Mar. 1, 2002, 2 pages.
Eriksson et al. "A High Performance Automotive Radar for Automatic AICC" IEEE AES Systems Magazine, Dec. 1995.
European Search Report for EP02770445 dated Mar. 15, 2005.
European Search Report for EP02775735 dated Mar. 9, 2006.
European Search Report for EP04701207 dated Oct. 23, 2006.
European Search Report for EP1435036 dated Mar. 9, 2006.
Examination Report dated Mar. 29, 2007 from European Patent Application No. 04 701 207.5, 3 pages.
Examination Report for Canadian Paten Application No. 2434756 dated Dec. 19, 2006.
Examination Report for EPO Patent Application No. 02770445. dated May 30, 2005.
Examination Report for EPO Patent Application No. 02775735.0-2215 dated Jun. 12, 2006.
Examination Report from Canadian Patent Application No. 2461411 dated Oct. 10, 2006.
Examination Report from Canadian Patent Application No. 2512689 dated Sep. 30, 2010.
*FCC Federal Communications Commission, Consumer & Government Affairs Bureau*, "Digital Radio—The Sound of the Future," http://www.fcc.gov/cgb/consumerfacts/digitalradio.html, Reviewed/Updated on Sep. 24, 2003, 3 pages.
Federal Register, Jun. 1 2001, vol. 66, No. 106, Participation in the Intelligent Transportation Infrastructure Program, 2 pages.
Forman, Michael, and Popovic, Zoya, "A K-Band Ground-Backed CPW Balanced Coupler and Integrated Antenna Feed," *European Microwave Conference*, Oct. 2000, 4 pages.
Frederick, J.D., et al., "A Novel Single Card FMCW Radar Transceiver with On Board Monopulse Processing," Available at least as early as Mar. 1, 2002, 4 pgs.
Galani et al. "An Overview of Frequency Synthesizers for Radars" IEEE Transaction on Microwave Theory and Techniques, vol. 39, No. 5, May 1991.
Gern, Axel, et al., "Advanced Lane Recognition—Fusing Vision and Radar,:" *Proceedings of the IEEE Intelligent Vehicles Symposium 2000*, Dearborn (MI) USA, Oct. 3-5, 2000, 7 pages.
Giles, Bradley C. and Jarrett, Bryan R., "Benefits of Auto-Configuring Traffic Sensing Equipment," Aug. 2004, 17 pages.
Gille, Sarah T. and Llewellyn Smith, Stefan G. "Velocity Probability Density Functions for Altimetry," *Journal of Physical Oceanography*, vol. 30, Jan. 2000, 12 pages.
Goldberg "Digital Frequency Synthesis Demystified" LLH Technology Publishing 1999.
Gonzalez, Juan Pablo, et al., "Lane Detection Using Histogram-Based Segmentation and Decision Trees," *2000 IEEE Intelligent Transportation Systems Conference Proceedings*, Dearborn (MI) USA, Oct. 10, 2000, 6 pages.
Gresham, Ian, et al., "Ultra Wide Band 24 GHz Automotive Radar Front-end," 2003 *IEEE MTT-S Digest*, 4 pages.
Howard, Julie, "Venture Capitalists Break Cover; Stellar Tech Ends 4 Years of Keeping a Low Profile," *The Idaho Statesman*, Sep. 9, 2003; http://www.idahostatesman.com/Business/story.asp?ID=48714, 2 pages.
*Idaho Business IQ*, "Stellar Opportunities; How One Idaho Investment Firm Views the State's Business Future," Idaho Business IQ, Nov./Dec. 2003, 5 pages.
IEEE Standard for Boundary-Scan-Based Stimulus of Interconnections to Passive and/or Active Components, "Printed Circuit Board" Definition (1999).
"IEEE Recommended Practice for Determining Safe Distances from Radio Frequency Transmitting Antennas When Using Electric Blasting Caps During Explosive Operations" IEEE Standards Coordinating Committee 28, Dec. 11, 2002.
*IMSA Journal*, "News Around the Industry, Spruce Meadows Partners," Nov./Dec. 2004, 4 pages.
International Preliminary Examination Report for PCT/US02/27682 dated Sep. 2, 2004.
International Preliminary Search Report for PCT/US02/27630 dated Aug. 16, 2004.
International Search Report and Written Opinion for PCT/US2010/037602 dated Aug. 6, 2010.
International Search Report and Written Opinion from PCT/US2007/064711 dated Sep. 4, 2008.
International Search Report and Written Opinion from PCT/US2010/037596 dated Aug. 19, 2010.
International Search Report for and Written Opinion PCT/US2014/013412 dated May 22, 2014.
International Search Report for PCT/US02/27630 dated Dec. 3, 2002.
International Search Report for PCT/US02/27682 dated Jun. 20, 2003.
International Search Report for PCT/US2004/00471 dated Aug. 31, 2005.

(56) References Cited

OTHER PUBLICATIONS

International Search Report for PCT/US2006/41324 dated May 1, 2007.
Written Opinion for PCT/US02/27630 dated Jun. 11, 2003.
*ISS & Econolite at Wavetronix*, "Dilemma Zone Detector (DZD): Summary Requirements" Jul. 18, 2003, 2 pages.
Jansson, Jonas, et al., "Decision Making for Collision Avoidance Systems," Copyright 2002, *Society of Automotive Engineers* Publication No. 2002-01-0403, 8 pages.
Kim, Ihn S., et al., "Two Novel Vehicle Detectors for the Replacement of a Conventional Detector," *Microwave Journal* (*International ed.*). Dedham: Jul. 2001 vol. 44, Iss. 7; http://proquest.umi.com/proxygw.wrlc.org/pqdlink?Ver. 7 pages.
Klein, Lawrence A., "Sensor Technologies and Data Requirements for ITS", Artech House, Norwood, MA, Jun. 2001, 739 pages.
Klotz, Michael, et al., "An Automotive Short Range High Resolution Pulse Radar Network," Jan. 2002.
Kolton, Greg, "Mobility Technologies Offers Exclusive Data and Technology with New Traffic Pulse Partner Program," Mobility Technologies, The Traffic.com People, Press Release, May 31, 2001, 6 pages.
Kotzenmacher, Jerry, et al., "Evaluation of Non-Intrusive Traffic Detection System," *2004 North American Travel Monitoring Exhibition & Conference* (*NATMEC*), Jun. 27, 2004, 13 pages.
Kramer, Gerd, "Envisioning a Radar-Based Automatic Road Transportation System," *Intelligent Transportation Systems*, May/Jun. 2001, 3 pages.
Liu, Henry X., et al., "Development of a Real-Time Arterial Performance Monitoring System Using Traffic Data Available for Existing Signal Systems" *Minnesota Department of Transportation Report*, Dec. 2008, 117 pages.
Liu, Huan-Chang, et al., "Radiation of Printed Antennas with a Coplanar Waveguide Feed," *IEEE Transactions on Antennas and Propagation*, vol. 43, No. 10, Oct. 1995, pp. 1143-1148.
Ma, Bing, et al., "Road and Lane Edge Detection with Multisensor Fusion Methods," *IEEE Publication* No. 0-7803-5467-2/99 Copyright 1999.
Manor, Daniel, "Spider: A Wireless Solution for Mid-block Detection," *IMSA Journal*, Mar./Apr. 2003, 6 pages.
Mende, Ralph Dr., et al., "A 24 GHz ACC Radar Sensor," *Smart Microwave Sensors GmbH*, Feb. 28, 2005.
Mende, Ralph, "The UMRR 24GHz Radar Sensor Family for Short and Medium Range Applications," *Smart Microwave Sensors GmbH*, Apr. 8, 2004.
Mende, Ralph, "UMRR: A 24GHz Medium Range Radar Platform," *Smart Microwave Sensors GmbH*, Jul. 25, 2003.
Merlo, "Automotive Radar for the Prevention of Collisions," IEEE, Feb. 1964.
Metzler, T., "Microstrip Series Arrays," I*EEE Transactions on Antennas and Propagation*, vol. AP-29, No. 1, Jan. 1981, pp. 174-178.
Middleton, Dan and Parker, Rick, "Initial Evaluation of Selected Detectors to Replace Inductive Loops on Freeways, Report No. FHWA/TX-00/1439-7," *Texas Transportation Institute*, on behalf of the Texas Department of Transportation; Construction Division, Apr. 2000, 90 pages.
*Millimeter Wave Radar Traffic Sensor AutoTrak*, Transportation Systems, Aug. 17, 2004 2 pages.
*MS Sedco, Motion Sensors*, "TC26-B Microprocessor-Controlled Vehicle Detector," Available at least as early as Mar. 1, 2002, at www.microwavesensors.com/motionsensors.html 6 pages.
*Naztec ATMS Solutions*,"Accuwave LX-150 Microwave Detector," Sugar Land, Texas; Available at least as early as Mar. 1, 2002, 3 pages.
Nunez-Garcia, Javier, et al., "Random Sets and Histograms," *Control Systems Center, UMIST, Fuzz-IEEE* 2001:1183-1186, http://www.umist/ac.uk/csc 2001, 6 pages.
On-Bench Photographs of Detectors, pp. 1-9, Available at least as early as Jan. 16, 2002 at http://ntl.bts.gov/DOCS/96100/ch04/body_ch04_04.html.
*Optisoft the Intelligent Traffic Signal Platform*, "Transportation Sensors Optional Features for the OptiSoft ITS Platform" Available at Least as Early as Aug. 30, 2010 1 pages.
*Optisoft the Intelligent Traffic Signal Platform*, "Red Light Hold Radar-based System Prevents Collisions from Red Light Runners" Available at least as early as Aug. 30, 2010, 2 pages.
Palen, J. "A Watching Brief," *Traffic Technology International* Oct./Nov. 2001 p. 43-46.
Pilutti, Tom, et al., "Identification of Driver State for Lane-Keeping Tasks" *IEEE Transaction on Systems, Man, and Cybernetics—Part A Systems and Humans*, vol. 29, No. 5, Sep. 1999, 17 pages.
Pordage, P. et al., "Technology at the Crossroads: New Radar Sensor Allows Pedestrians and Traffic to Coexist," *Cambridge Consultants* Feb. 24, 2004.
Pumrin, S., et al., "Roadside Camera Motion Detection for Automated Speed Measurement," *The IEEE 5th International Conference on Intelligent Transportation Systems*, Sep. 30, 2002, Singapore, 5 pages.
*Railway Grade Crossing Sensor*, Transportation Systems, Aug. 17, 2004 1 page.
Reijmers, Han, et al., "Performance Analysis of Slotted Aloha on a Three Lane Motorway Using Measured Vehicle Positions," *IEEE* Publication No. 0-7803-3659-3/97, Copyright 1997 IEEE, 5 pages.
Reijmers, Han, et al., "The Influence of Vehicle Distribution Models on Packet Success Probability on a Three Lane Motorway," *IEEE* Publication No. 0-7803-4320-4/98, Copyright 1998 IEEE, 5 pages.
Rivenq-Menhaj, et al., "Combining Two Radar Techniques to Implement a Collision Avoidance System," *IOP Electronic Journals, Measurement Science and Technology*, www.iop.org/EJ/abstract/09570233/9/8/030, from Meas. Sci Technol. 9 1343-1346, Aug. 1998, 2 pages.
Saito, Atsuchi, "Image Sensor for Measuring Volumes by Direction" *International Sales & Marketing Department Social Systems Solution & Service Business Company OMRON Corporation*, Tokyo Japan ITS World Congress Oct. 2004 1 page.
Sakai, Yasunobu, et al., "Optical Spatial filter Sensor for Ground Speed," Presented at the *International Commission of Optics Topical Meeting*, Kyoto, 1994, Optical Review, vol. 2, No. 1 (1995), 3 pages.
Schoepflin, Todd N., et al., "Dynamic Camera Calibration of Roadside Traffic Management Cameras," *The IEEE 5th International Conference on Intelligent Transportation Systems*, Sep. 3-6, 2002, Singapore, 6 pages.
Scoot Advice Leaflet 1: The "Scoot" Urban Traffic Control System; http://www.scoot-utc.com/documents/1_SCOOT-UTC; Nov. 14, 2012.
Sensor Technologies & Systems, Inc. AutoTrak Intelligent Transportation Systems/Advanced Traffic Management Systems Aug. 17, 2004 2 pgs.
Sensys RS240 Radar Sensor, circa Oct. 2002.
Smarglik, Edward J., et al., "Event-Based Data Collection for Generating Actuated Controller Performance Measures" *Journal of the Transportation Research Board*, No. 2035, 2007. pp. 97-106.
Smartmicro Home Page, 2016 (http://www.smartmicro.de/).
*SmarTek Systems, Inc.* "SmarTek Acoustic Sensor—Version 1 (SAS-1) Installation and Setup Guide;" Apr. 3, 2003.
*SmarTek Systems, Sensing and System Integration Solutions*, "The SAS 1 Passive Acoustic Vehicle Detector" Jan. 14, 2002, 2 pages.
SmartSensor Installation Guide WaveTronix Copyright 2004 pp. 1-26.
Smith, Ryan L., et al., "Development of a Low Cost, FM/CW Transmitter for Remote Sensing," IGARSS 2000 (Hawaii).
*SpeedInfo less traffic, more time*, "DVSS-1000 Installation Manual and Users Guide," Rev. 2.0, Feb. 18, 2004, 10 pages.
Stevenage, Herts, "IF Digital Generation of FMCW Waveforms for Wideband Channel Characterization," *IEEE Proceedings-I*, vol. 139, Jun. 1992 pp. 281-288.
Stewart, B.D., et al. "Adaptive Lane Finding in Road Traffic Image Analysis" University, Edinburgh, Uk Road, Traffic Monitoring and Control, Apr. 26-28, 1994 Conference Publication No. 391, IEEE, 1994 pp. 133-136.
Swangnate et al., A Conductor-Backed Coplanar Waveguide Direction Coupler for Varactor-Tuned Phase Shifting, Journal of KMITNB, vol. 12, No. 2, Apr.-Jun. 2002, 5 pages.

(56) References Cited

OTHER PUBLICATIONS

Task Force L Final Report, Executive Summary, pp. 1-40, Available at least as early as Jan. 16, 2002.
"A Technical Tutorial on Digital Signal Synthesis" Analog Devices, 1999.
Texas Highway Operations Manual, 1992.
"Traffic" Definition by K-Dictionaries, 2016.
"Traffic" Definition by Merriam-Webster, 2016.
Transportation Operations Group—Sensors, pp. 1-13, Available at least as early as Jul. 21, 2001.
Transportation Operations Group—Sensors, TTI Workshop on Vehicle Detection, TexITE Meeting, College Station, Texas, Jun. 22, 2000, 37pages, Available at: http://trasops.tamu.edu/content/sensors.cfm.
TRB "Traffic Flow Theory: A Monograph" Transportation Research Board, National Research Council, 1975.
*U.S. Department of Transportation Federal Highway Administration*, "Field Test of Monitoring of Urban Vehicle Operations Using Non-Intrusive Technologies, Final Report," May 1997, 123 pages.
"UMRR Traffic Management Sensor Data Sheet" Project Documentation, Smartmicro, Jan. 22, 2016.
"UMRR Automotive Sensor Data Sheet" Project Documentation, Smartmicro, Aug. 20, 2014.
University Research in Support of the Department of Transportation Program on Remote Sensing Applications in Transportation (DTRS56-00-BAA-0004) Nov. 1999.
Veeraraghavan, Harini, et al., "Computer Vision Algorithms for Intersection Monitoring" I*EEE Transactions on Intelligent Transportation Systems*, vol. 4, No. 2, Jun., 2003.
Waite, Jonathan L, and Arnold, David W. "Interferometric Radar Principles in Track Hazard Detection to Improve Safety," *IGASRSS* 2000 (Hawaii).
Walkenhorst, Brett T., et al., "A Low cost, Radio Controlled Blimp as a Platform for Remote Sensing," 2000 (Hawaii).
Waner, Stefan and Costenoble, Steven R., "Calculus Applied to Probability and Statistics," *Calculus and Probability*, Sep. 2, 1996, http://people/hofstra.edu/faculty/Stefan_Waner/cprob/cprob2.html, 13 pages.
Wang, et al. "Coordinated Vehicle Platoon Control: Weighted and Constrained Consensus and Communication Network Topologies," 51st IEEE Conference on Decision and Control, 2012, retrieved on [Jun. 5, 2014]. Retrieved from the internet: <URL: http://www.cs.wayne.edu/-hzhang/group/publications/pltCDC.pdf> entire document.
Weil, et al., "Across-the-Road Photo Traffic Radar: New Calibration Techniques," Electromagnetics Division (818.02), National Institute of Standards and Technology, 4 pages.
Wilson, Christopher K.H., et al., "The Potential of Precision Maps in Intelligent Vehicles," *Proceeding of IEEE Internaltion Conference on Intelligent Vehicles*, IEEE Oct. 1998, 4 pages.
Yang, Li, et al., "Bi-Mode Time-Space Multiplexing Antenna Array for Multi-Targets Detection in Automotive Application," *IEEE Publication* No. 0-7803-7070-8/01, Copyright 2001 IEEE, 4 pages.
Yellin, Daniel, et al., "An Algorithm for Dual-Chanel Noiseless Signal Reconstruction and its Performance Analysis," *IEEE Transactions on Signal Processing*, vol. 47, No. 6, Jun. 1999, 17 pages.
Yung, N.H.C., et al., "Vehicle-Type Identification through Automated Virtual Loop Assignment and Block-Based Direction biased Motion Estimation," *IEEE Publication* No. 0-7893-4975-X/98, Copyright 1999 IEEE, 5 pages.
Zaugg, David A., et al., "Ocean Surface and Landslide Probing with a Scanning Radar Altimeter," *IGARSS* 2000 (Hawaii).
Email of Jan. 9, 2014 from Dr. Mende to Individuals at Wavetronix.
Letter of Aug. 25, 2014 from Dr. Mende to David Arnold.
Transcript of Sep. 14, 2016 Deposition of Stephen W. Alland.
Transcript of Dec. 9, 2016 Deposition of Christopher Wilson.
Transcript of Dec. 30, 2016 Deposition of H. Gene Hawkins, Jr.
U.S. Appl. No. 09/966,146, Sep. 10, 2002, Office Action.
U.S. Appl. No. 09/964,668, Nov. 6, 2002, Office Action.
U.S. Appl. No. 09/966,146, Dec. 31, 2002, Notice of Allowance.
U.S. Appl. No. 09/964,668, Oct. 1, 2003, Notice of Allowance.
U.S. Appl. No. 10/744,686, Mar. 9, 2005, Office Action.
U.S. Appl. No. 10/754,217, Apr. 22, 2005, Office Action.
U.S. Appl. No. 10/744,686, Jun. 24, 2005, Office Action.
U.S. Appl. No. 10/754,217, Nov.17, 2005, Office Action.
U.S. Appl. No. 10/744,686, Dec. 2, 2005, Notice of Allowance.
U.S. Appl. No. 10/754,217, Feb. 28, 2006, Notice of Allowance.
U.S. Appl. No. 10/754,217, Jun. 20, 2006, Office Action.
U.S. Appl. No. 10/754,217, Jan. 11, 2007, Office Action.
U.S. Appl. No. 10/744,686, Jan. 29, 2007, Office Action.
U.S. Appl. No. 10/744,686, Aug. 9, 2007, Notice of Allowance.
U.S. Appl. No. 10/754,217, Aug. 17, 2007, Notice of Allowance.
U.S. Appl. No. 10/754,217, Oct. 11, 2007, Office Action.
U.S. Appl. No. 10/744,686, Nov. 21, 2007, Notice of Allowance.
U.S. Appl. No. 10/744,686, Mar. 7, 2008, Notice of Allowance.
U.S. Appl. No. 10/754,217, Apr. 8, 2008, Notice of Allowance.
U.S. Appl. No. 11/264,339, Apr. 6, 2009, Notice of Allowance.
U.S. Appl. No. 11/614,250, Nov. 4, 2009, Office Action.
U.S. Appl. No. 12/546,196, Nov. 5, 2009, Notice of Allowance.
U.S. Appl. No. 11/689,441, Jan. 8, 2010, Office Action.
U.S. Appl. No. 12/546,196, Jan. 27, 2010, Notice of Allowance.
U.S. Appl. No. 12/546,196, Feb. 26, 2010, Notice of Allowance.
U.S. Appl. No. 11/614,250, Mar. 11, 2010, Notice of Allowance.
U.S. Appl. No. 12/546,219, Mar. 11, 2010, Notice of Allowance.
U.S. Appl. No. 11/614,250, Jun. 10 2010, Notice of Allowance.
U.S. Appl. No. 12/546,219, Jun. 10, 2010, Notice of Allowance.
U.S. Appl. No. 11/689,441, Jun. 16, 2010, Notice of Allowance.
U.S. Appl. No. 12/546,196, Jun. 24, 2010, Notice of Allowance.
U.S. Appl. No. 11/689,441, Sep. 9, 2010, Notice of Allowance.
U.S. Appl. No. 12/546,196, Sep. 27, 2010, Notice of Allowance.
U.S. Appl. No. 11/614,250, Oct. 20, 2010, Notice of Allowance.
U.S. Appl. No. 12/546,219, Oct. 22, 2010, Notice of Allowance.
U.S. Appl. No. 11/614,250, Dec. 6, 2010, Notice of Allowance.
U.S. Appl. No. 12/546,219, Dec. 6, 2010, Notice of Allowance.
U.S. Appl. No. 12/546,196, Dec. 6, 2010, Notice of Allowance.
U.S. Appl. No. 11/689,441, Dec. 10, 2010, Notice of Allowance.
U.S. Appl. No. 11/689,441, Mar. 29, 2011, Notice of Allowance.
U.S. Appl. No. 12/502,965, Nov. 15, 2011, Notice of Allowance.
U.S. Appl. No. 12/502,965, Feb. 27, 2012, Notice of Allowance.
U.S. Appl. No. 12/710,736, Mar. 26, 2013, Office Action.
U.S. Appl. No. 12/710,736, Oct. 15, 2013, Notice of Allowance.
U.S. Appl. No. 13/753,869, Nov. 6, 2014, Office Action.
U.S. Appl. No. 13/753,869, Aug. 25, 2015, Final Office Action.
U.S. Appl. No. 14/164,102, Sep. 25, 2015, Notice of Allowance.
U.S. Appl. No. 13/753,869, Mar. 30, 2016, Notice of Allowance.
U.S. Appl. No. 14/962,377, Nov. 9, 2016, Notice of Allowance.
U.S. Appl. No. 15/187,508, Jan. 2, 2018, Notice of Allowance.
Final Decision for U.S. Appl. No. 09/964,668, entered on Jul. 17, 2017.
U.S. Appl. No. 15/198,512, Jun. 1, 2017, Office Action.
U.S. Appl. No. 15/187,508, Jun. 2, 2017, Ex Parte Quayle.
U.S. Appl. No. 15/187,508, Aug. 17, 2017, Notice of Allowance.
Final Written Decision (Paper 57) in IPR2016-00488, dated Jul. 17, 2017, 59 pages.
U.S. Department of Transportation, Federal Highway Administration, "Detection Technology for IVHS," vol. I: Final Report, Dec. 1996, 182 pages.
U.S. Appl. No. 15/928,616, Jan. 7, 2019, Notice of Allowance.
U.S. Appl. No. 15/198,512, Feb. 15, 2018, Final Office Action.
U.S. Appl. No. 15/187,508, Dec. 26, 2017, Notice of Allowance.
U.S. Appl. No. 15/928,616, filed Mar. 22, 2018, Arnold.
A 24 GHz ACC Radar Sensor, Smart Microwave Sensors GmbH, Feb. 28, 2005.
Accuwave LX-150 Microwave Detector, Available at least as early as Mar. 1, 2002, 3 pages.
Atlantic Scientific Corporation, Corporate overview. Available at least as early as Mar. 6, 2006.
Baker, "Grounding and Bonding-Part 3: Introduction and Resources," IMSA Journal. Available at least as early as Aug. 30, 2010.
Buczkowski, "Automatic Lane Detection", PWT 2012, Poznan, 2012.
Cambridge Consultants; Technology at the crossroads: new radar sensor allows pedestrians and traffic to coexist Feb. 24, 2004, 2 pages.

(56) References Cited

OTHER PUBLICATIONS

Computer Vision Algorithms for Intersection Monitoring; Harini Veeraraghavan, Osama Masoud, and Nikolaos P. Papanikolopoulous, Senior Member, IEEE IEEE Transactions on Intelligent Transportation Systems, vol. 4, No. 2, Jun. 2003.
Copyright Office Catalog Full Record for Chang, published 2000/05/30.
Copyright Office Catalog Full Record for Galani, circa 1991.
Copyright Office Catalog Webpage for Chang, published 2000/05/30.
Copyright Office Catalog Webpage for Galani, circa 1991.
Declaration of Christopher Wilson, dated Oct. 18, 2016.
Declaration of David V. Arnold, dated Sep. 6, 2016.
Declaration of Gerard P. Grenier, Executed on Aug. 4, 2016.
Declaration of H. Gene Hawkins, Jr. Executed on Oct. 17, 2016.
Declaration of Ken Gentile, Executed on Aug. 8, 2016.
Declaration of Stephen Alland, Executed on Jan. 20, 2016.
Executive Summary: Scope of the Study, http://www.tfhrc.gov/advanc/ivhs/chapter1.htm, accessed Mar. 2, 2005.
Final Decision for U.S. Appl. No. 09/964,668 dated Jul. 17, 2017.
ITS Decision, Other Roadside Detectors, Intelligent Transpiration Systems - Traffic Surveillance, accessed Mar. 2, 2005.
J.D. Frederick et al., A Novel Single Card FMCW Radar Transceiver with On Board Monopulse Processing, Available at least as early as Mar. 1, 2002, 4 pgs.
J.L. Waite et al. "Interferometric Radar Principles in Track Hazard Detection to Improve Safety," IGARSS 2000 KHawaii). Available at least as early as 2000/07/24.
Kim, et al., Two Novel Vehicle Detectors for the Replacement of a Conventional Detector, Microwave Journal KInternational ed.). Dedham: Jul. 2001 vol. 44, Iss. 7; http://proquest.umi.com/proxygw.wrlc.org/pqdlink7Ver. 7 pages.
Lawson, "Case Histories Keeping That Cargo Dry and Viable". Available at least as early as Mar. 6, 2006.
Liu et al. "Radiation of Printed Antennas with a Coplanar Waveguide Feed," IEEE Transactions on Antennas and Propagation, vol. 43, No. 10, Oct. 1995, pp. 1143-1148.
Mckeon, "John Foster: Stellar Technologies". Available at least as early as Mar. 6, 2006.
NASA Jet Propulsion Laboratory: California Institute of Technology, "Ocean Surface Topography from Space-Technology", available at https://sealevel.jpl.nasa.gov/technology/, accessed May 21, 2015.
Optisoft the Intelligent Traffic Signal Platform, "Transportation Sensors Optional Features for the OptiSoft ITS Platform" Available at Least as Early as Aug. 30, 2010.
Patent Owner's First Set of Interrogatories to Petitioner, dated Sep. 7, 2016.
Red Light Hold, Radar-based system prevents collisions from red light runners, Optisoft The Intelligent Traffic Signal Platform, 2 pgs, Aug. 2005.
Reynolds, Desiccant City: Case Histories: Award Winners, "Technical Achievements Shine Among FPA Winners", Available at least as early as Mar. 6, 2006.
RTMS General Information, pp. 1-6, Available at least as early as Jul. 21, 2001.
RTMS Traffic Detector Primer, pp. 1-4, Available at least as early as Jul. 21, 2001.
SmarTek Systems, The SAS-1 Passive Acoustic Vehicle Detector, www.smarteksys.com/sas-1 .sub.--flyer.htm, Sep. 2001.
Stellar Opportunities, How One Idaho Investment Firm Views the State's Business Future, Idaho Business IQ, Nov./Dec. 2003, 5 pages.
Supplemental Affidavit of Brent P. Lorimer in Support of Motion for Pro Hae Vice Admission. Available at least as early as Apr. 26, 2016.
Texas Transportation Institute, Initial Evaluation of Selected Detectors to Replace Inductive Loops on Freeways, Report No. FHWA/TX-00/1439-7, Apr. 2000, 89 pages.
The UMRR 24GHz Radar Sensor Family for Short and Medium Range Applications, Smart Microwave Sensors GmbH, Apr. 8, 2008.
Transportation Systems Millimeter Wave Radar Traffic Sensor AutoTrak Aug. 17, 2004 2 pgs.
Transportation Systems Railway Grade Crossing Sensor Aug. 17, 2004 1 pg.
Vehicle DetectorWorkshop, TexITE, Jun. 2000, pp. 5-39.
SmarTek Systems, The SAS-1 Passive Acoustic Vehicle Detector, www.smarteksys.com/sas-1_flyer.htm Sep. 2001.
SmarTek Acoustic Sensor—Version 1 (SAS-1), Installation and Set-Up Guide, Jul. 25, 2000.

* cited by examiner

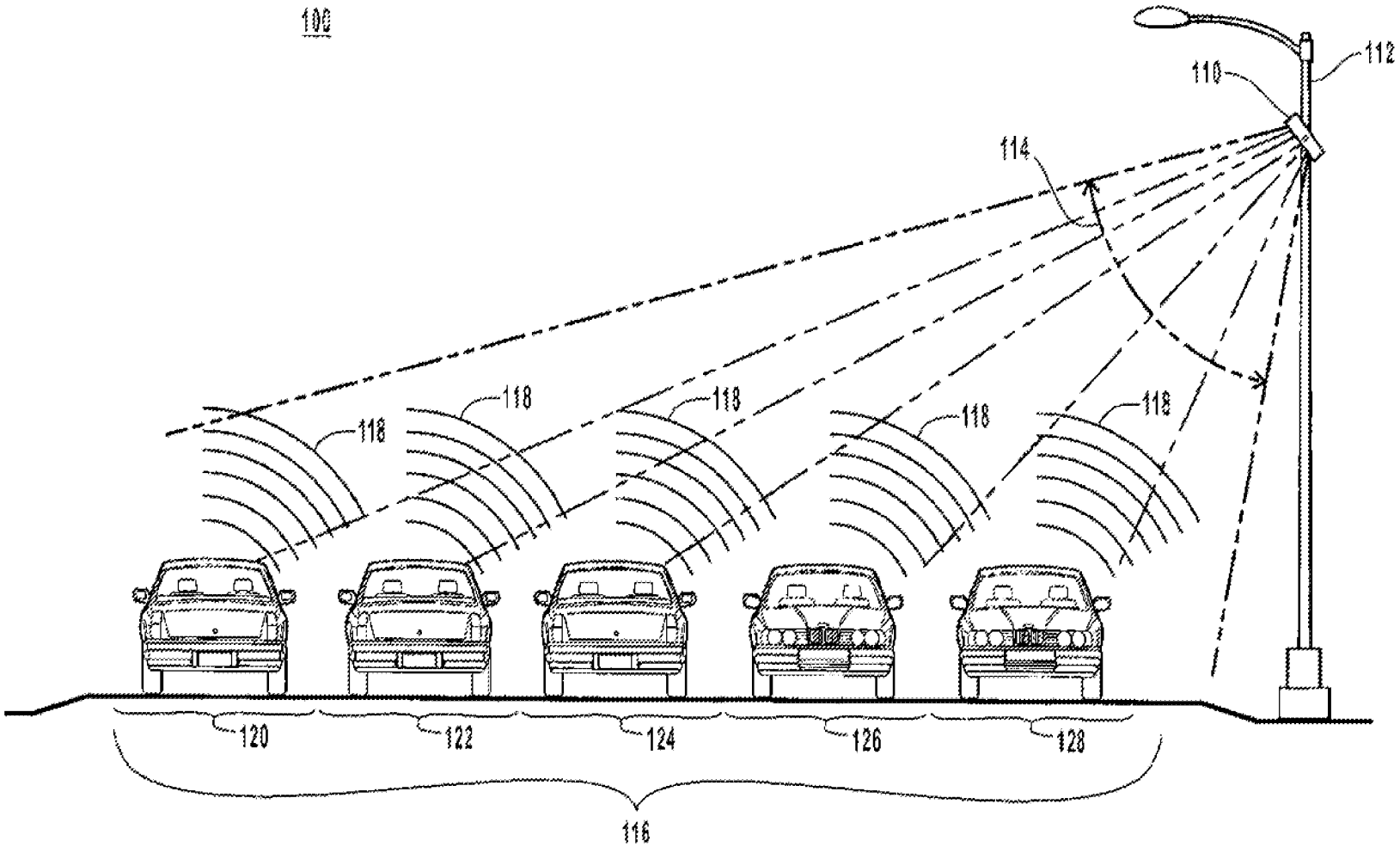
Fig. 1
NEW

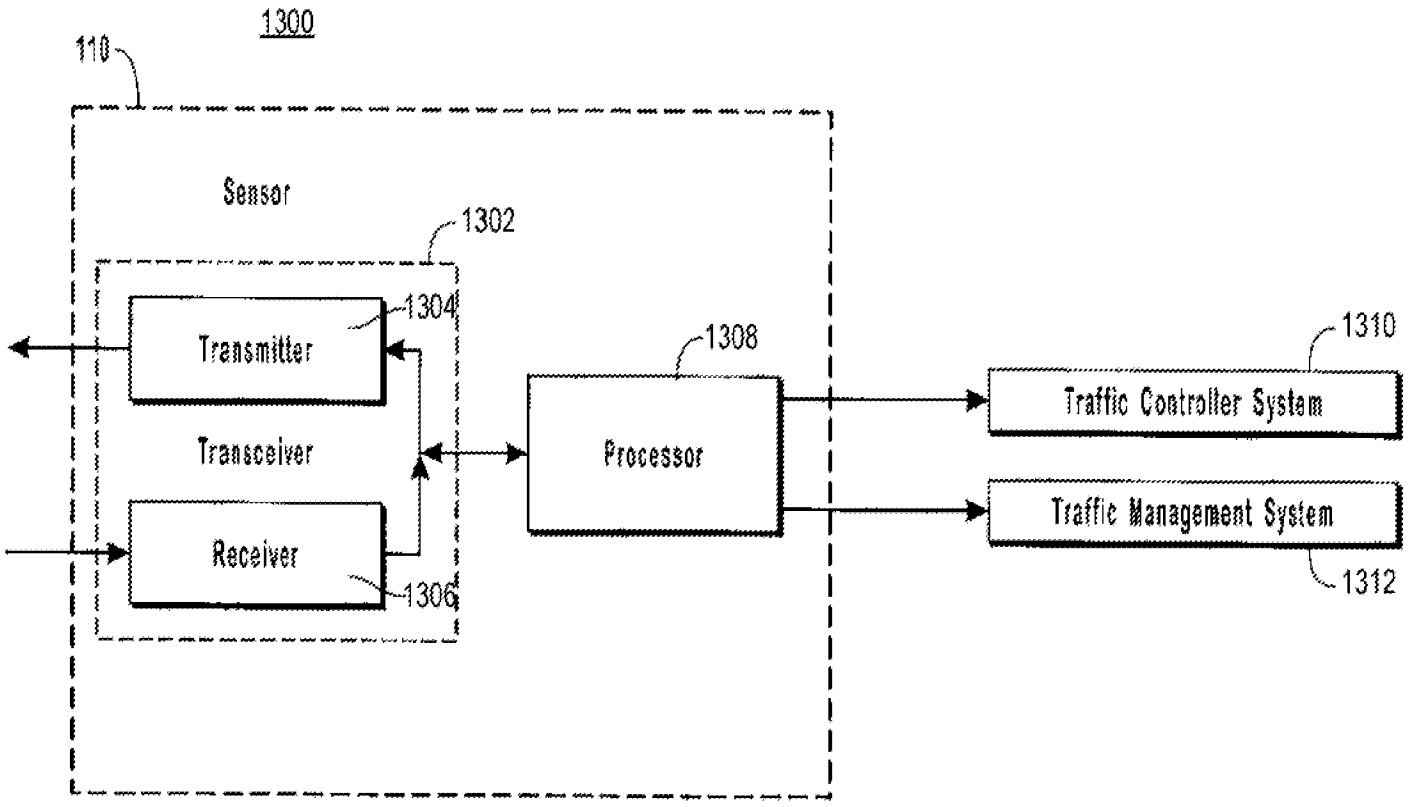
Fig. 13
NEW

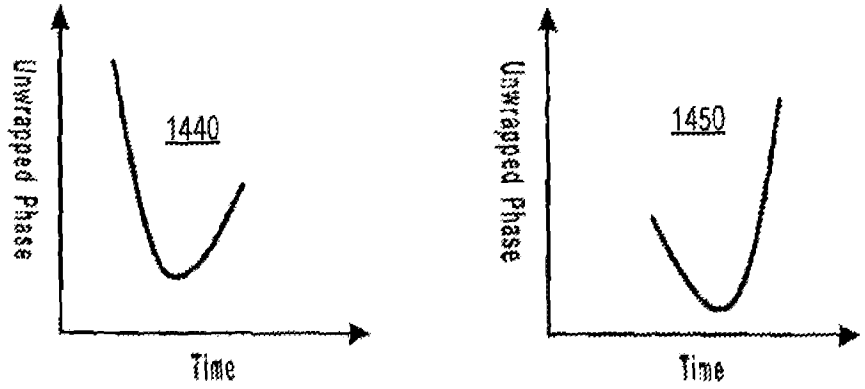
Fig. 14
NEW

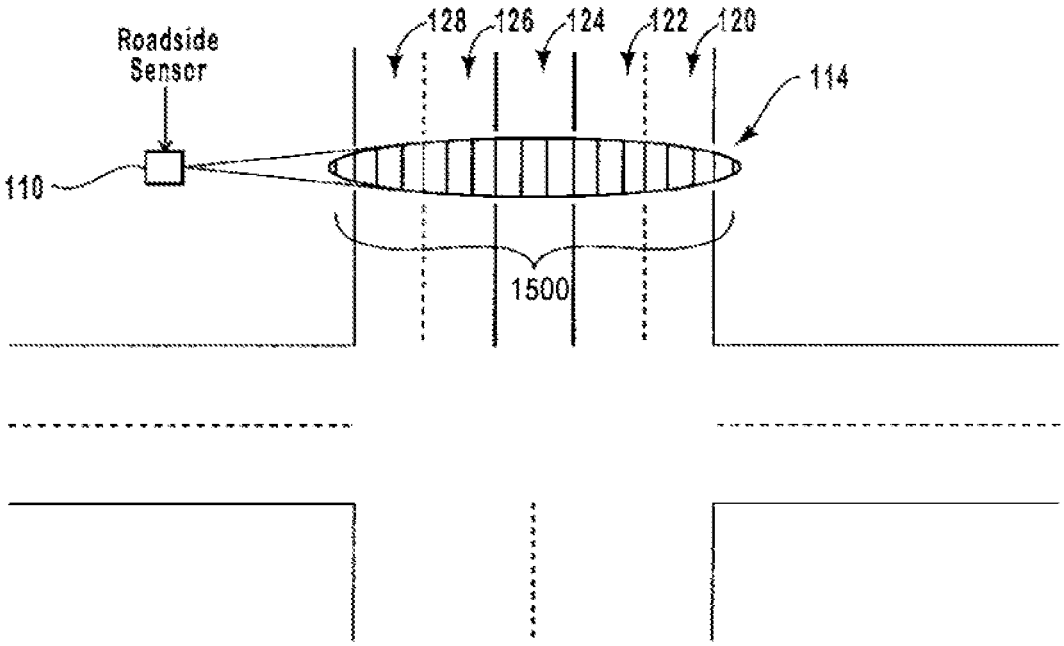
Fig. 15
NEW

VEHICULAR TRAFFIC SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is related to U.S. patent application Ser. No. 09/996,146 "System and Method of Dynamic Identification of Traffic Lane Positions," by inventors Jonathon L. Waite, Thomas William Karlinsey and David V. Arnold, filed concurrently herewith and incorporated by reference now U.S. Pat. No. 6,556,916.

BACKGROUND OF THE INVENTION

1. The Field of the Invention

The present invention relates generally to vehicular traffic monitoring systems, and more particularly relates to sensors for detecting the presence, location, speed, direction of travel, volume, and occupancy of vehicular traffic on a roadway.

2. The Relevant Technology

Controlled signalized intersections represent a key element in urban planning, public safety and traffic control. The science and engineering of traffic planning and control has long relied on the use of sensor devices designed for this specific purpose and, more recently, for the collection of traffic flow data. Some of these device technologies, such as those embedded in the roadways, have been employed for over sixty years and continue to require the same amount of attention in installation, calibration, maintenance, repair and replacement as they did decades ago. This laborious caretaking can be due to a number of factors ranging from inferior product design and poor installation to post installation disruption and migratory changes in traffic flow patterns. Reliability of these technologies is an issue to an overall traffic control plan and can prove extremely costly to maintain as an integral component to an overall traffic plan.

Traffic control devices that are embedded in roadways serve the interest of public safety, but in the event of a new installation, or maintenance/repair, they act as a public nuisance, as repair crews are required to constrict or close multiple lanes of traffic for several hours to reconfigure a device, or even worse, dig up the failed devices for replacement causing closure of the lane for several days or weeks.

While several sensor technologies are employed to assist in traffic planning and control, the oldest and most widely used technology currently employed in controlled intersections is the inductive loop. This loop is an in-pavement fixed location sensor, with the limitation of sensing only the traffic that is immediately over it. While such devices have continued history of use, failures of loops are common and at any one time as many as 20%-30% of all installed controlled intersection loops are non-responsive. Furthermore, the cost to repair these devices can be greater than the original installation cost.

As technology has developed over the decades, new sensory devices have been introduced to the traffic control industry. In recent years, there have emerged several non-intrusive technologies for traffic sensing that employ a remote sensor (i.e., not embedded in the roadway) as illustrated in FIG. 1. While the majority of these types of sensors 110 incorporate microwave radar technology, other types including optical devices have also taken hold. For example, intersection traffic cameras may be manually configured to analyze specific user-defined traffic zones at all times. As cameras rely on optics, (i.e., the ability to visually see the traffic that is to be monitored) they are susceptible to the forces of nature that can occlude visibility. These forces include sun glare, accumulated snow or dirt and darkness. Under ideal conditions cameras would only need to be serviced or reconfigured with major intersection redesign. Presently available systems require on-site attention to improve and upgrade the capability of the unit, or complete replacement for upgrading the camera itself.

Another type of above-ground sensor includes acoustic sensors which operate as traffic sound-based listening devices. These devices employ an array of microphones built into the sensor allowing the device to detect traffic based on spatial processing changes in sound waves received at the sensor. After processing and analysis of the received sound waves, detection and traffic flow information is then assigned to the appropriate user-defined regions or lane being monitored, *thereby* forming a picture of the traffic.

When acoustic sensors are deployed, their microphone sensitivity is pre-set for normal operating conditions which include typical weather conditions. Again, the software and operating instructions to control an acoustic sensor require on-site attention to improve and upgrade the capability of the unit, or complete replacement to upgrade the sensor itself.

Other popular sensor types are based on microwave radar technology. Such sensors detect traffic based on the reflection of a transmitted electromagnetic signal depicted in FIG. 1 as signals 118. The received signal is then processed into detection and traffic flow information which is then assigned to the appropriate user-defined lane being monitored. As illustrated in FIGS. 2 and 3, microwave radar technology utilizes several bulky, expensive and manufacturably inefficient components to sense traffic. Most notably, microwave radar sensors are comprised of a mechanically-large horn antenna 170 and separate radio frequency components and controller boards that are individually tuned and matched in order to result in an operable system 180. Furthermore, the unit requires on-site maintenance and attention to reconfigure, or upgrade software.

As identified above, many useful forms of technology exist to monitor and detect traffic. However, many forms of detection are obtrusively bulky, manufacturing intense, and all require on site maintenance and attention to re-configure the software, or operating instructions when traffic conditions, climate, or other operating conditions change. Without reconfiguration, the devices will continue to sense, but with reduced accuracy and in the worst case they may discard the actual flow pattern as peripheral noise. The cost to manufacture and reconfigure devices can be costly, and disruption to traffic is common.

*Vehicular traffic monitoring continues to be of great public interest since derived statistics are valuable for determination of present traffic planning and conditions as well as providing statistical data for facilitating more accurate and reliable urban planning. With growing populations, there is increasing need for current and accurate traffic statistics and information. Useful traffic information requires significant statistical gathering of traffic information and careful and accurate evaluation of that information.*

*Additionally, the more accurate and comprehensive the information, such as vehicle density per lane of traffic, the more sophisticated the planning may become.*

*Roadway traffic surveillance has relied upon measuring devices, which have traditionally been embedded into the road, for both measuring traffic conditions and providing control to signaling mechanisms that regulate traffic flow. Various sensor technologies have been implemented, many of which have been "in-pavement" types. In-pavement sensors include, among others, induction loops which operate on magnetic principles. Induction loops, for example, are loops of wire which are embedded or cut into the pavement near the center of a pre-defined lane of vehicular traffic. The loop of wire is connected to an electrical circuit that registers a change in the inductance of the loops of wire when a large metallic object, such as a vehicle, passes over the loops of wire embedded in the pavement. The inductance change registers the presence of a vehicle or a count for the lane of traffic most closely associated with the location of the induction loops.*

*Induction loops and other in-pavement sensors are unreliable and exhibit a high failure rate due to significant mechanical stresses caused by the pavement forces and weather changes. Failures of loops are common and it has been estimated that at any one time, 20%-30% of all installed controlled intersection loops are non-responsive.*

*Furthermore, the cost to repair these devices can be greater than the original installation cost.*

*Installation and repair of in-pavement sensors also require significant resources to restrict and redirect traffic during excavation and replacement and also present a significant risk to public safety and inconvenience due to roadway lane closures which may continue for several hours or days. Interestingly, some of these technologies have been employed for over sixty years and continue to require the same amount of attention in installation, calibration, maintenance repair and replacement as they did several decades ago. This can be due to a number of factors from inferior product design or poor installation to post installation disruption or changing traffic flow patterns. Subsequently this technology can be extremely costly and inefficient to maintain as an integral component to an overall traffic plan.*

*To their credit, traffic control devices serve the interest of public safety, but in the event of a new installation, or maintenance repair, they act as a public nuisance, as repair crews are required to constrict or close multiple lanes of traffic for several hours to reconfigure a device or even worse, dig up the failed technology for replacement by closing one or more lanes for several days or weeks. Multiple lane closures are also unavoidable with embedded sensor devices that are currently available when lane reconfiguration or re-routing is employed. Embedded sensors that are no longer directly centered in a newly defined lane of traffic may miss vehicle detections or double counts a single vehicle. Such inaccuracies further frustrate the efficiency objectives of traffic management, planning, and control.*

*Such complications arise because inductive loop sensors are fixed location sensors, with the limitation of sensing only the traffic that is immediately over them. As traffic patterns are quite dynamic and lane travel can reconfigure based on stalled traffic, congestion, construction/work zones and weather, the inductive loop is limited in its ability to adapt to changing flow patterns and is not able to reconfigure without substantial modification to its physical placement.*

*Several non-embedded sensor technologies have been developed for traffic monitoring. These include radar-based sensors, ultrasound sensors, infrared sensors, and receive-only acoustic sensors. Each of these new sensory devices has specific benefits for traffic management, yet none of them can be reconfigured or adapted without the assistance of certified technicians. Such an on-site modification to the sensors may require traffic disruptions and may take several hours to several days for a single intersection reconfiguration.*

*Another traffic monitoring technology includes video imaging which utilizes intersection or roadside cameras to sense traffic based on recognizable automobile characteristics (e.g.; headlamps, bumper, windshield, etc.). In video traffic monitoring, a camera is manually configured to analyze a specific user-defined zone within the camera's view. The user-defined zone remains static and, under ideal conditions may only need to be reconfigured with major intersection redesign. As stated earlier, dynamic traffic patterns almost guarantee that traffic will operate outside the user defined zones, in which case, the cameras will not detect actual traffic migration. Furthermore, any movement in the camera from high wind to gradual movement in the camera or traffic lanes over time will affect the camera's ability to see traffic within its user-defined zone. In order to operate as designed, such technology requires manual configuration and reconfiguration.*

*Another known technology alluded to above includes acoustic sensors which operate as traffic listening devices. With an array of microphones built into the sensor, the acoustic device is able to detect traffic based on spatial processing changes in sound waves as the sensor receives them. Detection and traffic flow information are then assigned to the appropriate user-defined lane being monitored. This technology then forms a picture of the traffic based on the listening input, and analyzes it based on user assigned zones. Again, once the sensor is programmed, it will monitor traffic flow within the defined ranges only under ideal conditions.*

*Like an imaging camera, the acoustic sensor can hear traffic noise in changing traffic patterns, but it will only be monitored if it falls within the pre-assigned zone. Unable to reconfigure during changes in the traffic pattern, the acoustic sensor requires on-site manual reconfiguration in order to detect the new traffic flow pattern. In an acoustic sensor, microphone sensitivity is typically pre-set at a normal operating condition, and variations in weather conditions can force the noise to behave outside those pre-set ranges.*

*Yet another traffic sensor type is the radar sensor which transmits a low-power microwave signal from a source mounted off-road in a "side-fire" configuration or perpendicular angle transmitting generally perpendicular to the direction of traffic. In a sidefire configuration, a radar sensor is capable of discriminating between multiple lanes of traffic. The radar sensor detects traffic based on sensing the reflection of transmitted radar. The received signal is then processed and, much like acoustic sensing, detection and traffic flow information are then assigned to the appropriate user-defined lane being monitored. This technology then forms a picture of the traffic based on the input, and analyzes it based on user-assigned zones. Under ideal conditions, once these zones are manually set, they are monitored as the traffic flow operates within the pre-set zones. Consequently, any change in the traffic pattern outside those predefined zones needs to be manually reset in order to detect and monitor that zone.*

*As discussed above, several sensors may be employed to identify multiple lanes of vehicular traffic. While sensors may be positioned to detect passing traffic, the sensors must be configured and calibrated to recognize specific traffic paths or lanes. Consequently, such forms of detection sen-*

*sors require manual configuration when the system is deployed and manual reconfiguration when traffic flow patterns change.*

*Furthermore, temporary migration of traffic lanes, such as during, for example, a snow storm or construction re-routing, results in inaccurate detection and control. Without reconfiguration, the devices may continue to sense, but they may discard the actual flow pattern as peripheral noise, and only count the traffic that actually appears in their user-defined zones. The cost to configure and reconfigure devices can be considerable, and disruption to traffic is unavoidable under any circumstance. Furthermore, inaccurate counting of traffic flow can result in improper and even unsafe traffic control and inaccurate and inconvenient traffic reporting.*

*Thus, there exists a need for a method and system for configuring and continuously reconfiguring traffic sensors according to current traffic flow paths thereby enabling improved traffic control, traffic planning and enhanced public safety and convenience without requiring constant manual evaluation and intervention.*

BRIEF SUMMARY OF THE INVENTION

A vehicle sensor for detecting and monitoring vehicular targets is presented. The sensor employs a planar design resulting in a reduced profile sensor and a greatly improved sensor for manufacturing. Improvements are a result of controlled manufacturing processes for forming controlled interconnects and structures on replicable circuit boards.

The sensor of the present invention includes a multi-layer radio frequency board having a first side which includes at least a majority of the RF components. On the opposing side of the board is a ground plane providing isolation to the RF components. Additionally, the opposing side also has printed thereon array transmit and receive antennas for radiating a signal toward a vehicular target and for receiving the signal as reflected from the vehicular target. The planar antennas provide a replicable antenna structure that is easily manufactured.

The sensor device further includes logic/control functionality which may be co-located or positioned separately on at least one logic or signal processing board that is preferably populated with components on a first side with a ground plane on a second side. The second or ground plane side is preferably positioned toward the RF componentry of the RF board to form an RF shield about the RF componentry. The boards are housed within a housing that is permeable to electromagnetic waves, at least on the side through which the antenna structures radiate. To provide additional RF absorption and isolation, an RF absorber is placed between the boards to provide additional isolation of RF emanations near to the source of generation.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates an above-ground sensor employing propagation delay calculation for position calculation of vehicular traffic;

*FIG. 13 is a block diagram of a sensor within the traffic system of the present invention;*

*FIG. 14 illustrates the curves associated with angular viewing of traffic with the associated differentiation of traffic direction; and*

*FIG. 15 is a simplified diagram of a sensor and roadway configuration, in accordance with a preferred embodiment of the present invention.*

DETAILED DESCRIPTION OF THE PREFERRED EMBODIMENTS

Figure 2:
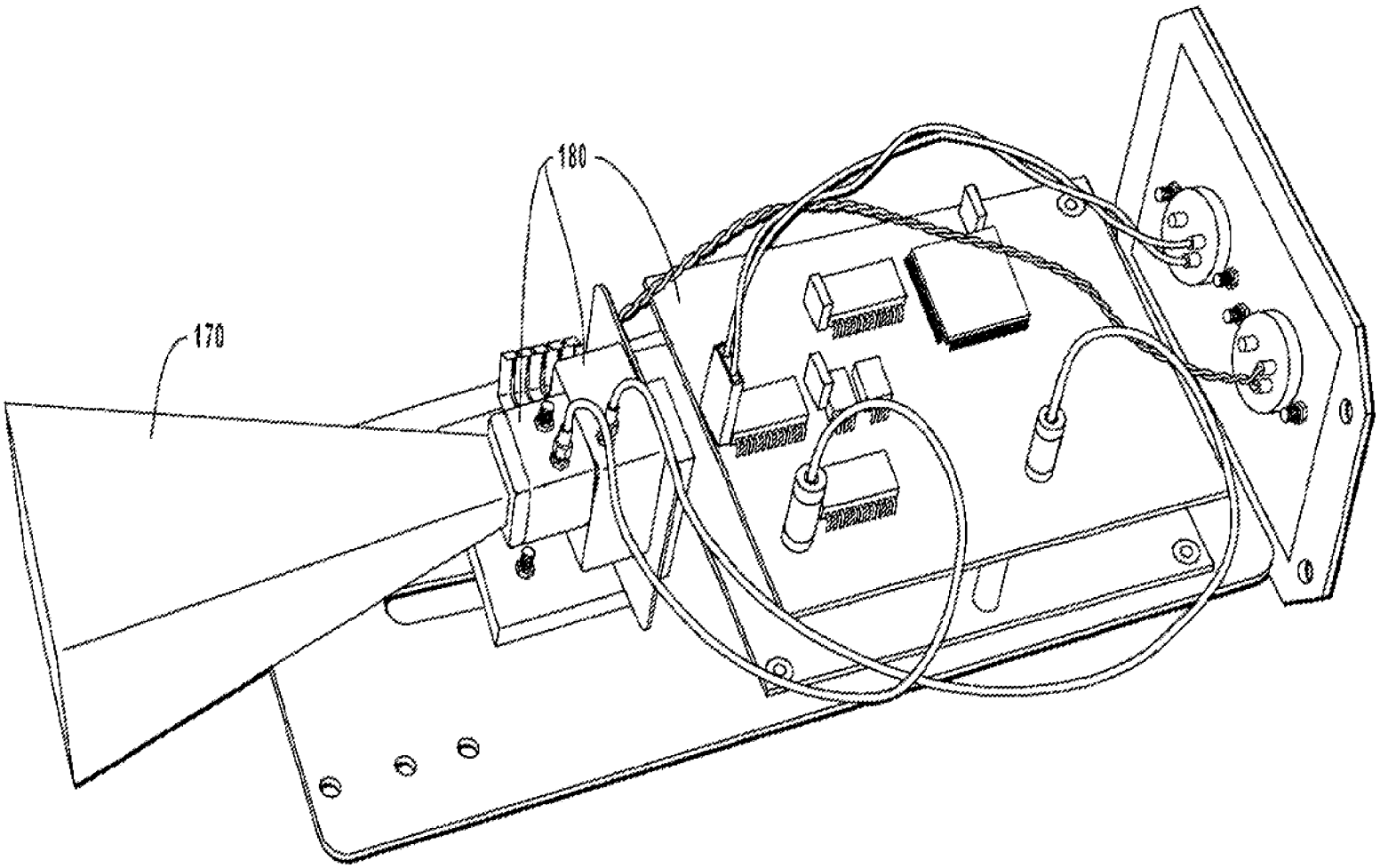
FIG. 2 (PRIOR ART)
FIGS. 2-3 illustrate a radar sensor comprised of horn antennas and multiple modules, in accordance with the prior art.
Figure 3:
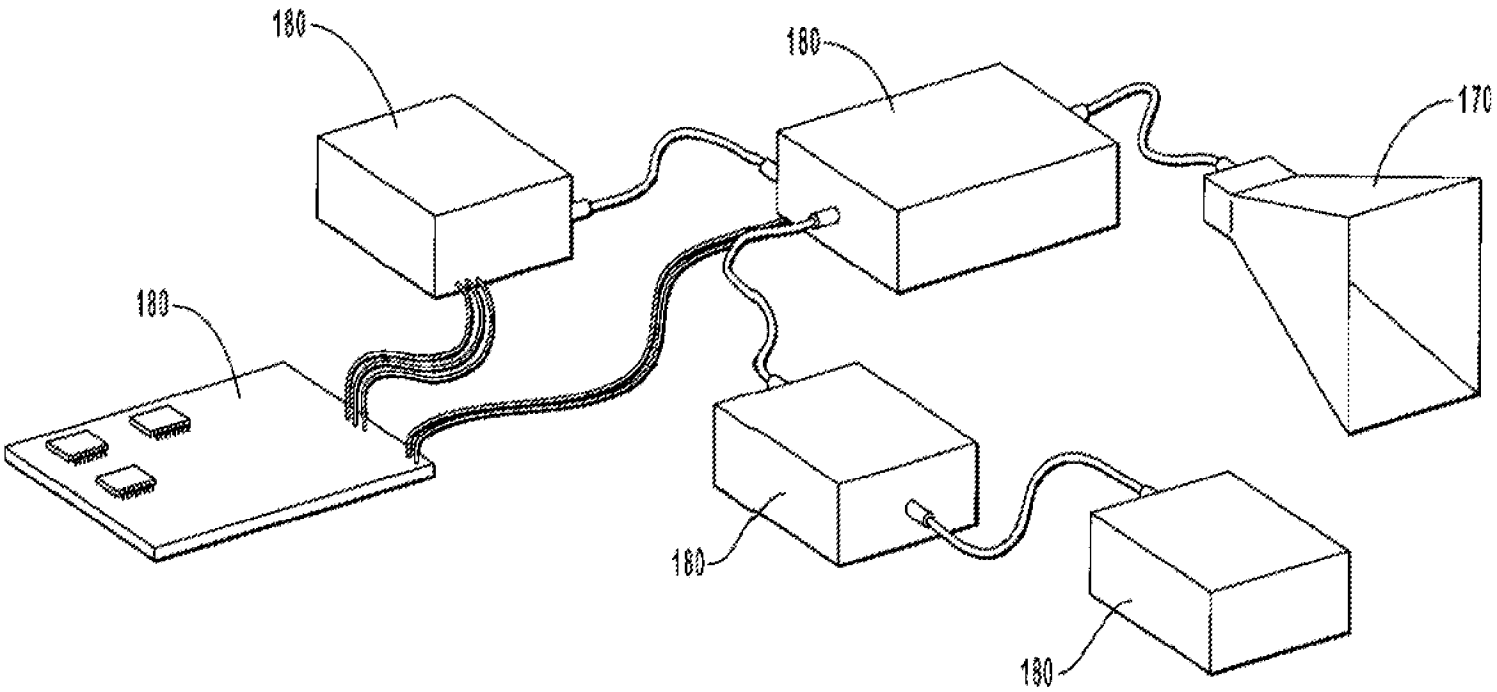
FIG. 3 (PRIOR ART)
Figure 4:
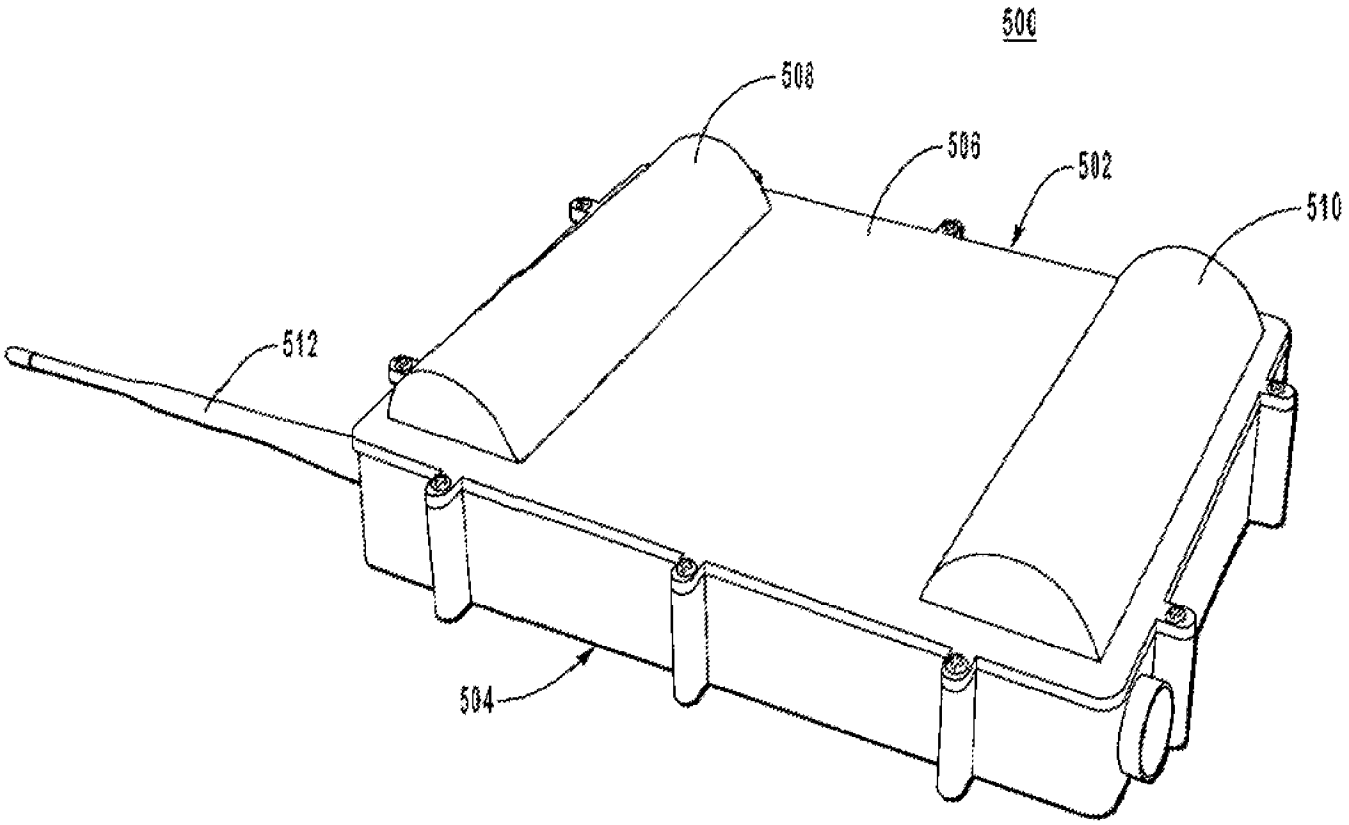
FIG. 4 illustrates an integrated above-ground traffic sensor, in accordance with the preferred embodiment of the present invention.

FIG. 4 is a perspective view of a traffic monitoring sensor, in accordance with a preferred embodiment of the present invention. A sensor 500 is illustrated having a generally planar topology due to the planarization of components including planarization of a transmit and receive antenna. Sensor 500 is a generally sealed enclosure comprised of a material that is permissive to the exchange of electromagnetic propagations. Sensor 500 is also generally comprised of a housing 502 for enclosing the multi-layer radio frequency circuit board and other processing component boards such as digital signal processing and/or control assemblies. Housing 502 includes a back surface 504 and a top or front surface 506. During deployment of sensor 500, front surface 506 is directed generally orthogonal with the roadway or portion of roadway undergoing monitoring. In the present invention, the term "above-ground" sensor means that the sensor is not embedded into the roadway but rather may be mounted above or about the roadway at various acceptable angles.

As the electromagnetic signals must propagate through front surface 506 as radiated from planar printed circuit board antennas described below, front surface 506 further includes geometries that facilitate reduced distortion of the antenna radiation pattern throughout the entire beamwidth of the antennas. FIG. 4 depicts such distortion-minimizing geometries as radomes 508 and 510.

FIG. 4 further depicts additional sensor enhancements which are structurally depicted as communication link antenna 512 which facilitates both transmission of accumulated sensor data as well as reception of commands and software upgrades. The power and serial communication link are facilitated through the connector 514.

Figure 5:
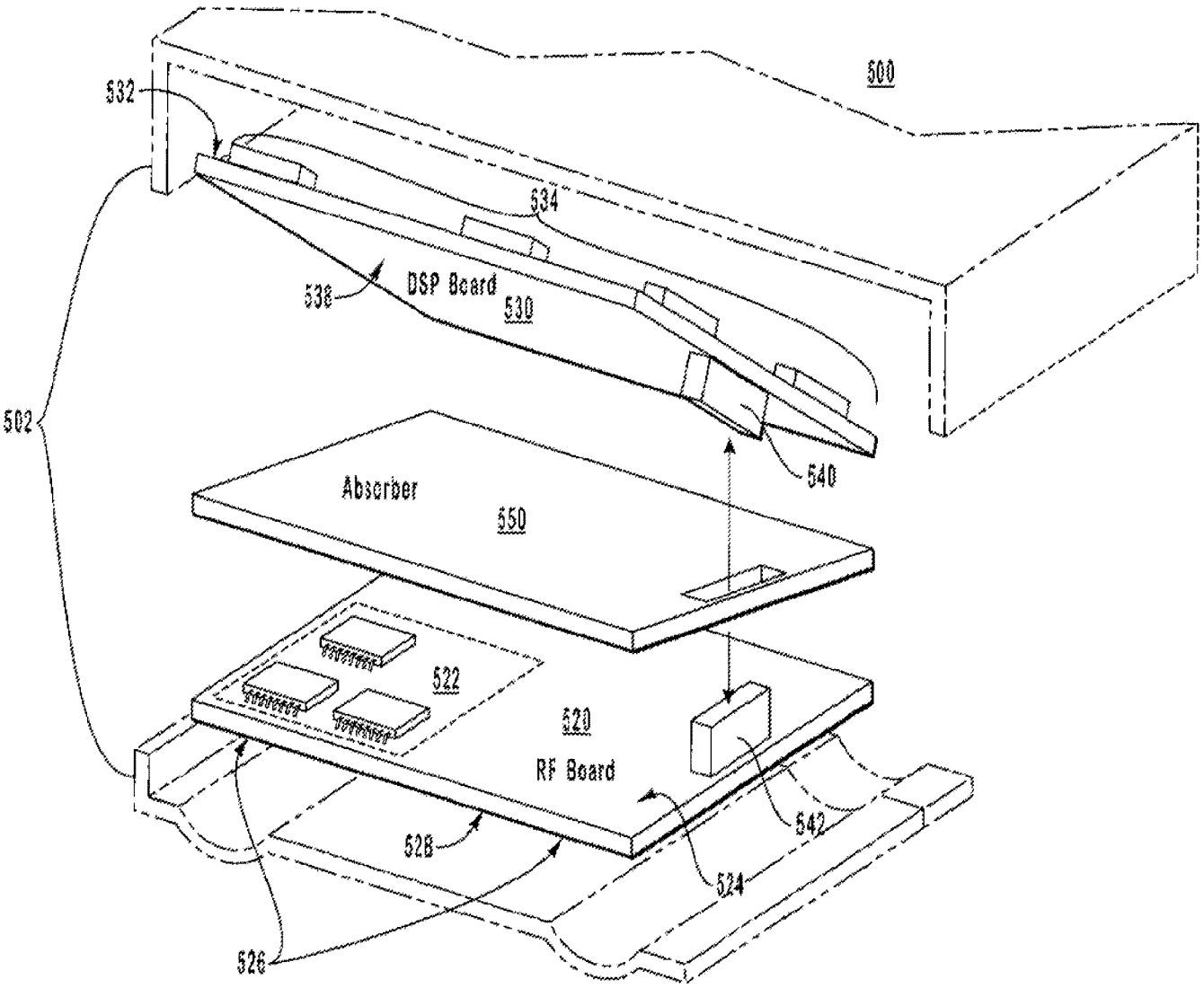
FIG. 5 illustrates the mechanical integration of RF components and signal processing components, in accordance with the preferred embodiment of the present invention.

FIG. 5 illustrates an exploded view of sensor 500, in accordance with the preferred embodiment of the present invention. In addition to including housing 502, sensor 500 further includes a multi-layer radio frequency circuit board 520 which includes radio frequency components 522 disposed on a first side 524. Circuit board 520 further includes antennas 526 on an opposing second side 528. Such a configuration accommodates an integrated and efficient topology of a sensor since bulky horn antennas are not employed. Furthermore, the integration of radio frequency components onto a planar circuit board arrangement having the antenna also disposed thereon dramatically improves manufacturability.

Sensor 500 further includes at least one controller/signal processing circuit board 530 having a first side 532 for disposing signal processing component 534 thereon and a second side having an electrically conductive ground layer 538. Electrically conducted ground layer 538 functions as an RF shield when it is oriented in parallel and facing multi-layer radio frequency circuit board 520 upon final assembly within housing 502. Ground layer 538 also functions as a ground plane for the controller/signal processing circuit board. Signal processing board 530 and radio frequency circuit board 520 interact via connectors 540 and 542, respectively.

Sensor 500 further comprises an absorber 550 located between multi-layer radio frequency circuit board 520 and signal processing board 530. Absorber 550 comes into proximity of both the electrically conductive ground layer 538 on board 530 and the first side 524 having RF components 522 thereon of radio frequency circuit board 520. In order to minimize the disturbance of the desired electromagnetic fields in the RF structures about and interconnecting RF components 522, channels or cutouts preferably extending only partially into absorber 550 are incorporated within absorber 550 that provide clearance around such RF components including transmission lines located on first side 524 of radio frequency circuit board 520.

Figure 6:
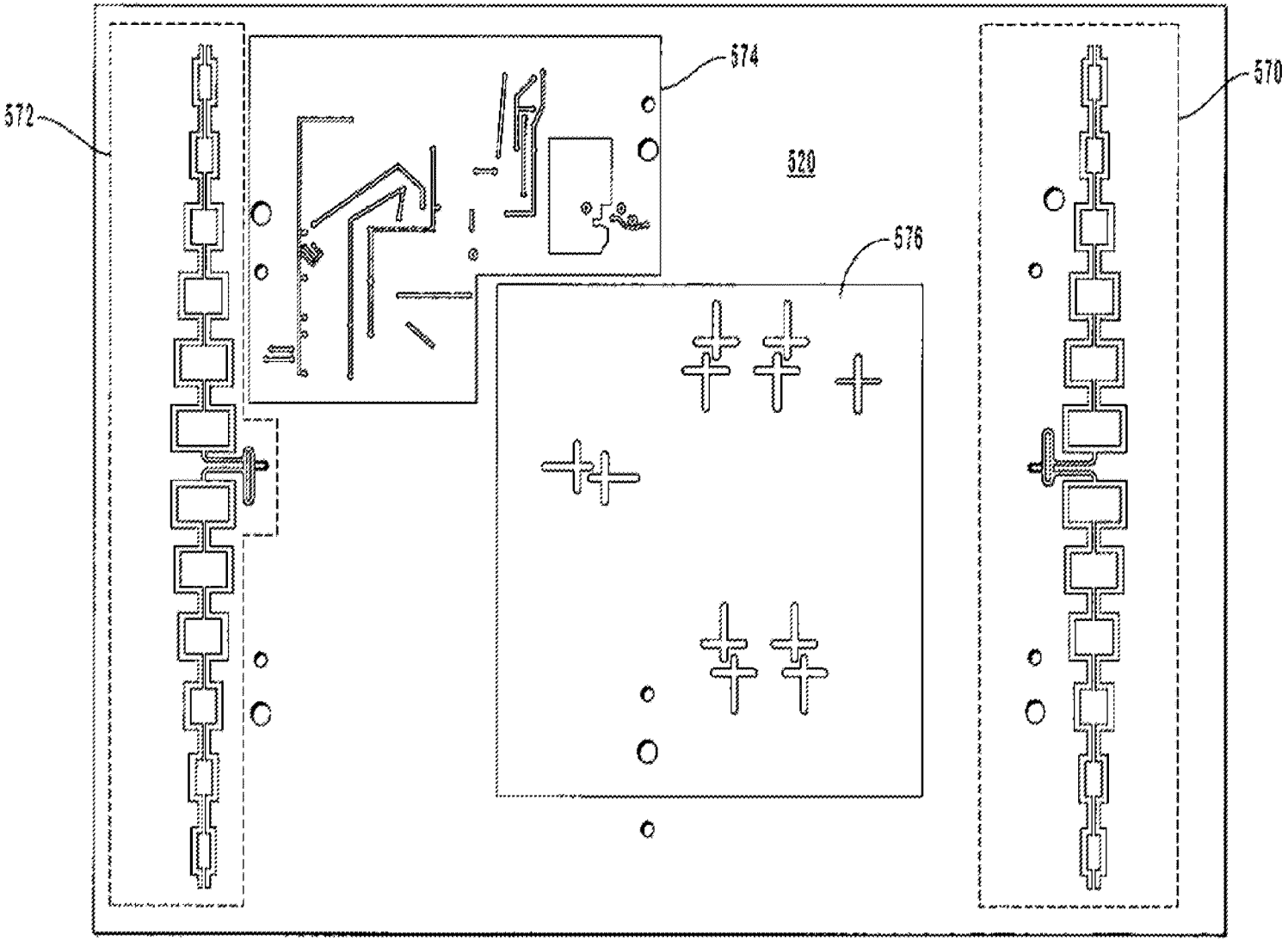
FIG. 6 illustrates planar antennas integrated into the RF module board, in accordance with the preferred embodiment of the present invention.

FIG. 6 illustrates an exemplary layout of second side or antenna side 528 of multi-layer radio frequency circuit board 520. The antenna system of the present invention is placed on the same circuit board as the other RF circuitry. The antenna system includes two coplanar loop series-fed array antennas 570 and 572 that are preferably located on opposite ends of RF circuit board 520 and on the opposite side of the circuit board from RF circuitry components 522. Thus, in the preferred embodiment, one side of the circuit board includes antennas 570 and 572 with possibly DC interconnect lines 574 and miscellaneous bias networks 576, while side 524 includes RF components 522.

Figure 7:
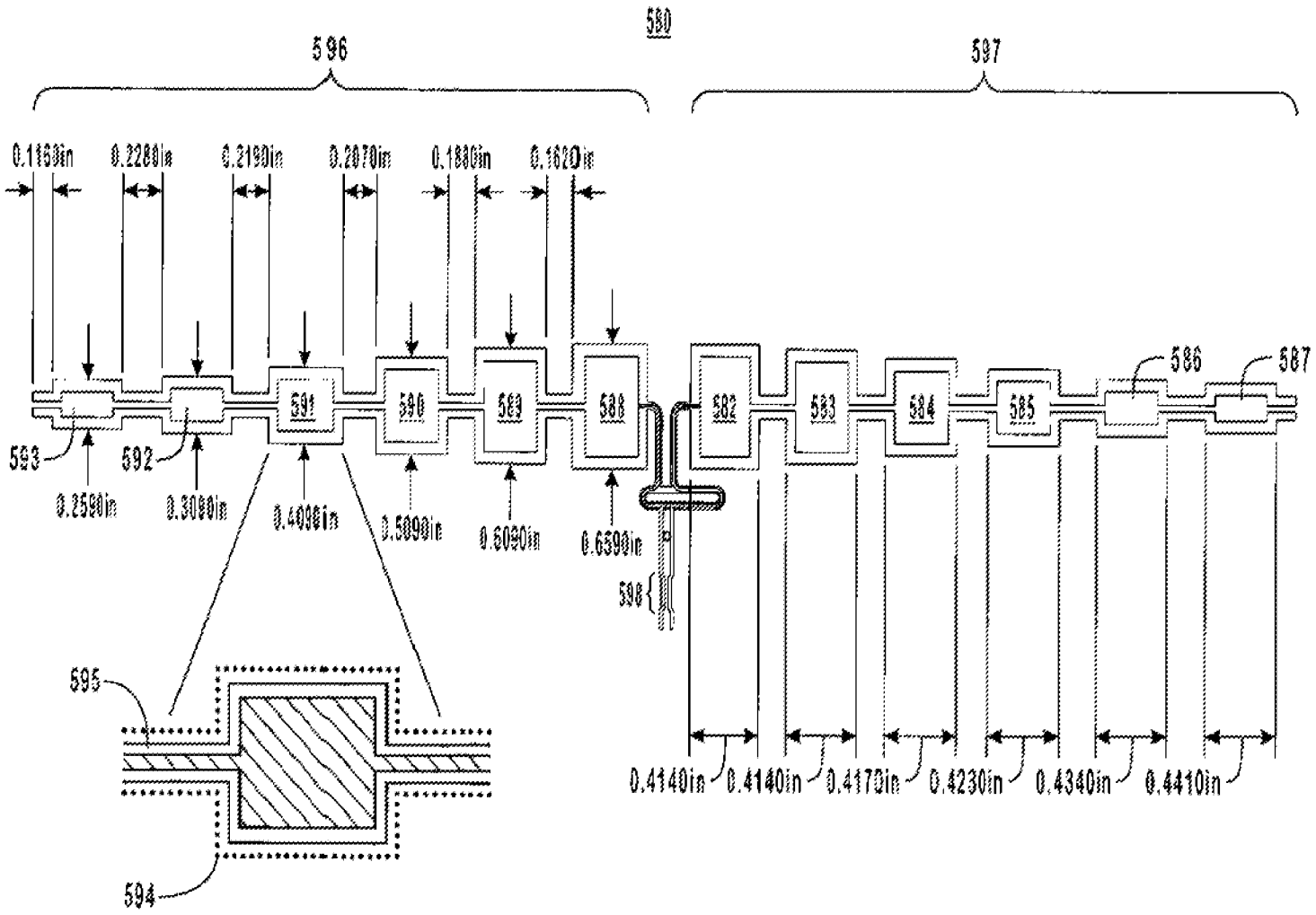
FIG. 7 is a detail of one of the planar antennas, in accordance with a preferred embodiment of the present invention.

FIG. 7 illustrates a detailed layout of a planar printed circuit board antenna, in accordance with a preferred embodiment of the present invention. The present invention utilizes a coplanar waveguide loop antenna 580 for radiating and receiving microwave signals projected about a vehicular target. The present configuration employs a series of radiating elements. In the present implementation, areas of metal are surrounded by slots or areas with no metal. This structure can be implemented by surrounding the metal with air, or by printing it on a dielectric substrate, or on a conductor backed dielelectric substrate. This is a non-resonant element that exhibits many desirable properties such as wide bandwidth, and a low coupling between adjacent elements. The radiation from this element is polarized horizontally as oriented in FIG. 7. In a conductor backed implementation, the elements radiate only out of the page.

FIG. 7 depicts an array of series-fed coplanar loop elements 582-587 and 588-593. In the present invention, the coplanar waveguide traveling wave series loop antenna element exhibits the broadband qualities of a traditional coplanar loop and can be combined in a series like the series-fed microstrip patch. For an appreciation of related structures, the following articles are incorporated herein by reference: H. C. Liu, T. S. Horng, and N. G. Alexopoulos, "Radiation of Printed Antennas with Coplanar Waveguide Feed," IEEE Trans. Antennas Propgat., vol. 43 no. 10, pp. 1143-1148, October 1995; and A. G. Demeryd, "Linearly Polarized Microstrip Antennas," IEEE Trans. Antennas Propogat., pp. 846-851, November 1976.

In the present invention, since the coplanar series loop is not a resonant element, the size of the element can be readily adjusted. This size adjustment results in an alteration to the amount of radiation exhibited. Thus, tapered arrays can be designed by utilizing radiating elements with varying sizes. The coplanar waveguide series loop element is implemented using the following features: a conductor backed dielectric substrate 704, 702 (see FIG. 9), grounding vias 594 to prevent substrate propagation, and wide coplanar slots 595 to reduce the effects of manufacturing variations.

The use of a conductor backed dielectric substrate limits the radiation from the element to only one side of the element and also facilitates manufacturing as the element can be printed on a dielectric laminated with metal on both sides. The grounding vias 594 prevent the propagation of parallel plate modes that may exist when dielectric is laminated on both sides by metal. These parallel plate modes could cause coupling between radiating elements printed on the same substrate and could cause unpredictable antenna input impedances.

The wide coplanar slots 595 help in several ways. First, wide coplanar slots increase radiation and increase tolerance to manufacturing variations. Second, circuit boards are often coated with solder mask and conformal coating to protect the board and components. These coatings, however, fill the coplanar slots and cause unpredictable phase shifts. The widening of the coplanar slots reduces this effect. By way of example and not limitation, slots 595 in the preferred embodiment assume a width of 60 mils., which provides the needed tolerance to manufacturing and coating variations but also maintains the necessary coplanar properties. The width of the center conductor of the coplanar waveguide is chosen to achieve the desired transmission line characteristic impedance.

The detail of FIG. 7 illustrates vias 594, that in a preferred embodiment are plated with copper to create a grounded short between the top ground plane and the bottom ground plane. In the present example, vias 594 are placed so that the edge of the via is 25 mil. from the edge of the slot which is sufficient to result in marginal influence to the transmission line characteristics but sufficiently close to effectively channel the electromagnetic energy.

A tapered antenna array 596, 597 may be implemented through the use of varying element sizes. Series-fed arrays, such as this one in the present example, are used to replace corporate feed designs in which each element is fed by its own individual transmission line. The corporate feed approach requires an intricate feed structure that becomes more complicated when different antenna elements are used in the array or when a tapered feed is desired. Furthermore, corporate feed structures are prone to undesired radiation which results in antenna pattern distortion.

The exemplary loop dimensions given on FIG. 7 illustrate the heights of the loops and tapering towards the edges of the array. The radiating edges of the loops are the vertical sides (as oriented in FIG. 7). Thus, variations in the height of the loop results in changes to the degree of radiation from the loop. Consequently, the tapering of the loop size results in a radiation power distribution that creates a radiation pattern with low side lobes. The dimensions shown on the array 597 illustrate the loop widths increasing towards the edges of the array. This ensures that the radiating edges of the loop are in-phase. This dimension results in the widths being larger as the heights are smaller. The exact loops dimensions were determined through simulation.

The lengths of transmission lines between the loops illustrated on array 596 are adjusted to facilitate every loop radiating in phase. As shown, these lengths are longer for smaller loops. These lengths are again determined from simulation. As illustrated in FIG. 7, the left half of the array 596 is fed from the right and the right half of the array 597 is fed from the left. This would cause an 180° phase shift between the two sides of the array 580 if not compensated for. Since the transmission lines which feed the two sides of the array are of different lengths, the line as illustrated on the right is exactly ½ wavelength longer than the line on the left. This provides the compensation to achieve in-phase radiation from both sides of the array.

In the present example, the antenna 580 is fed from a 50 Ω transmission line that drives two 100 Ω lines, which intersect at a tee. From the tee to the edges of the array, the transmission lines are 100 Ω. Notice that the 50 Ω transmission line feeding the antenna narrows for a section 598 and then returns to the standard width. This section 598 of the line is a quarter-wave matching section used to provide an impedance match to antenna 580. The ends of the array are terminated by short-circuited transmission lines. This termination causes a standing wave pattern throughout the antenna and causes the antenna as a whole to become a resonant structure. This has an advantage over a matched termination in that the antenna gain is higher since there are no losses in the termination. If a higher bandwidth antenna is needed, however, a matched termination, which would result in a traveling wave antenna, may be employed.

Figure 8:
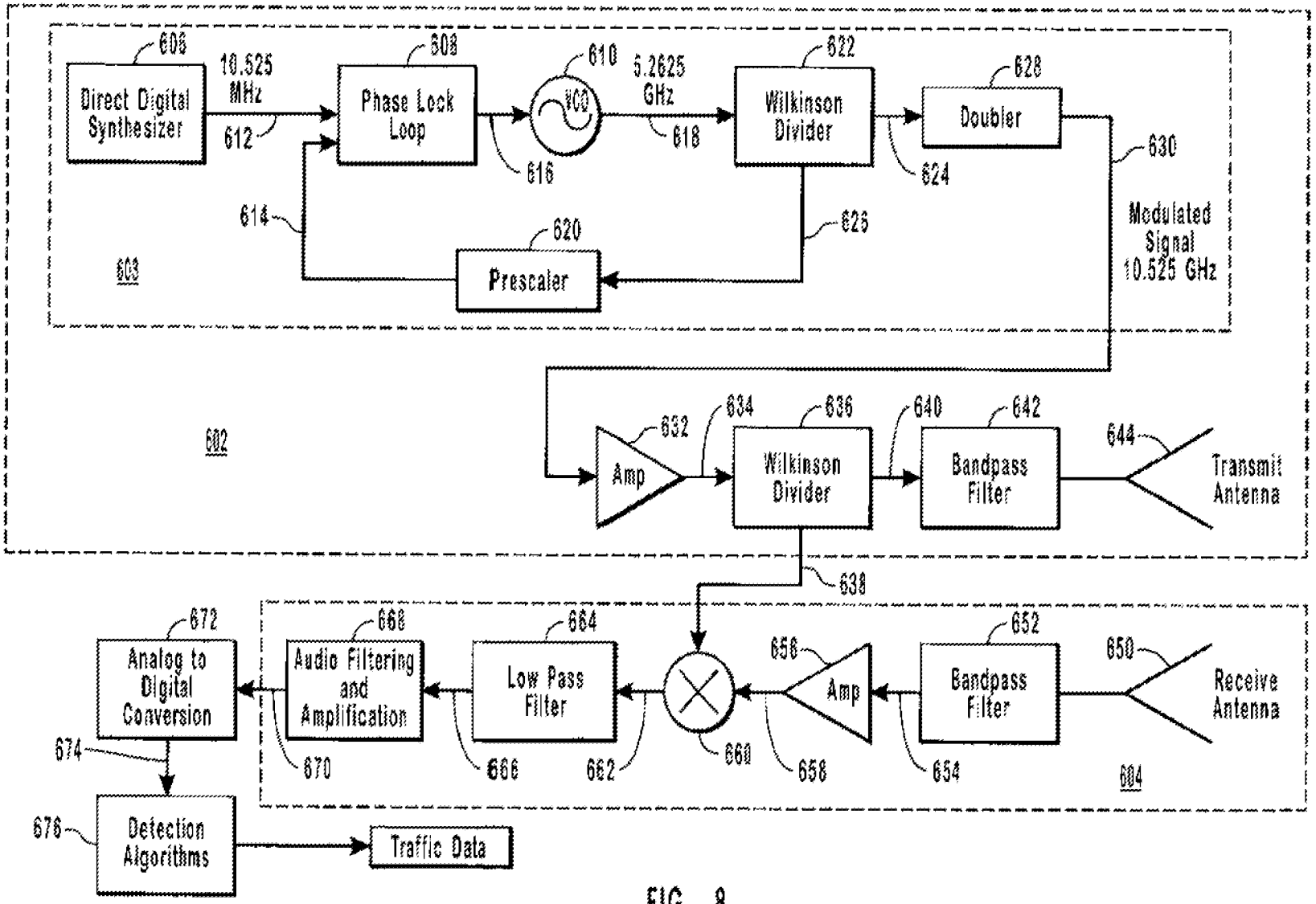
FIG. 8 is a block diagram of the component side of the RF board assembly and other related functional blocks, in accordance with the present invention.

FIG. 8 is a functional block diagram of the radio frequency circuit board with other blocks of related functionality, in accordance with a preferred embodiment of the present invention. The functionality of radio frequency circuit board 520 (FIG. 5) may be partitioned into a transmit portion 602, including a digitally generated modulated signal generator 603, and a received portion 604. Transmit portion 602 is comprised, in the preferred embodiment, of a direct digital synthesizer (DDS) 606 for creating a signal 612 that sweeps in frequency.

While the present embodiment depicts frequency generation using a DDS, it is also contemplated that other wave form generating devices, generally herein known as digitally generated modulated signal generators, including numerically controlled devices, may be employed for generating effective waveforms. In the preferred embodiment, a modulated signal is generated digitally and is thus phase-locked to a digital clock. This modulated signal is then up-converted, if necessary, to the desired band.

Figure 10:
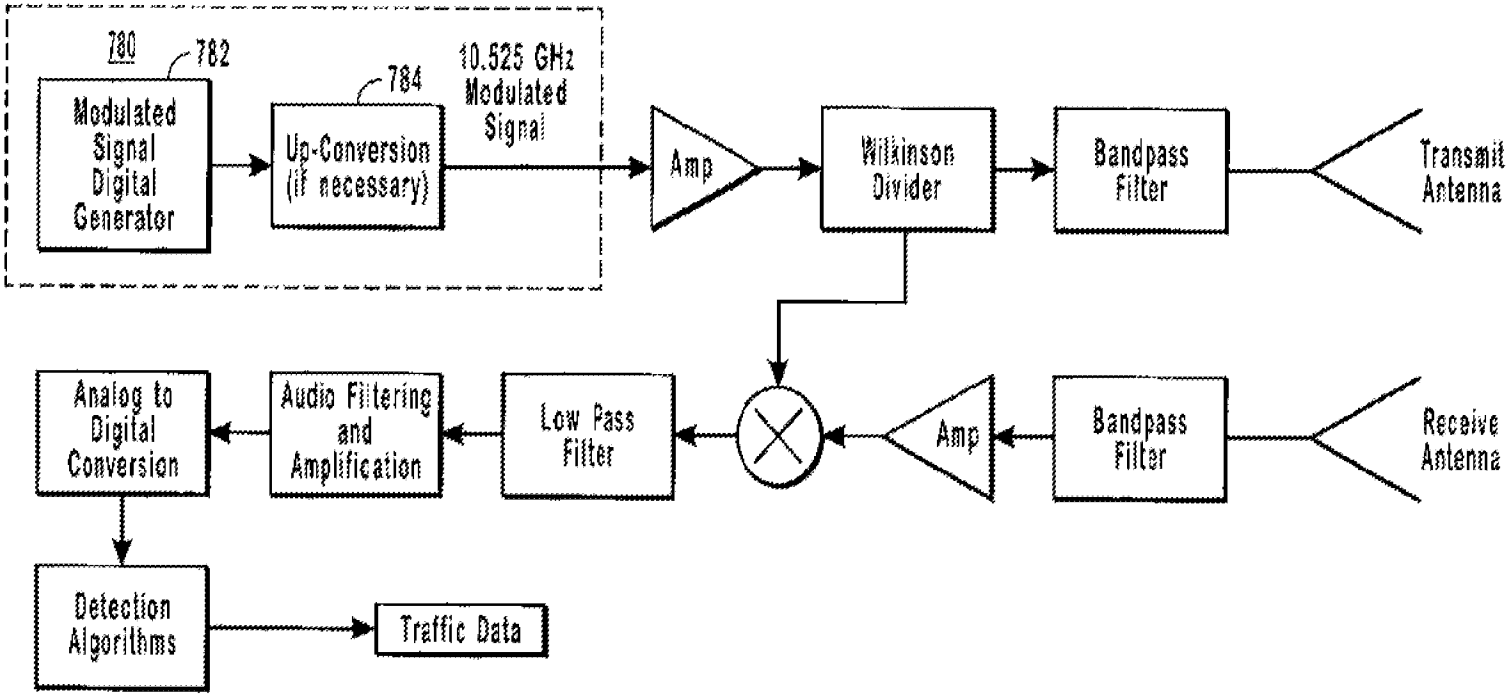
FIG. 10 illustrates an embodiment of the present invention that employs a modulated signal digital generator for generating the desired signal.

Various embodiments for the digital generation are depicted in FIGS. 8, and 10-12. FIG. 10 illustrates another embodiment for digitally generating a modulated signal. In this approach, a digitally generated modulated signal generator 780 is comprised of a modulated signal digital generator 782 and an optional up-convertor 784. In this embodiment, the modulated signal generator provides significant advances over analog signal generators by providing enhanced phase stability over time and improved modulation control which results in lower compression sidelobes and improved detection algorithms.

Figure 11:
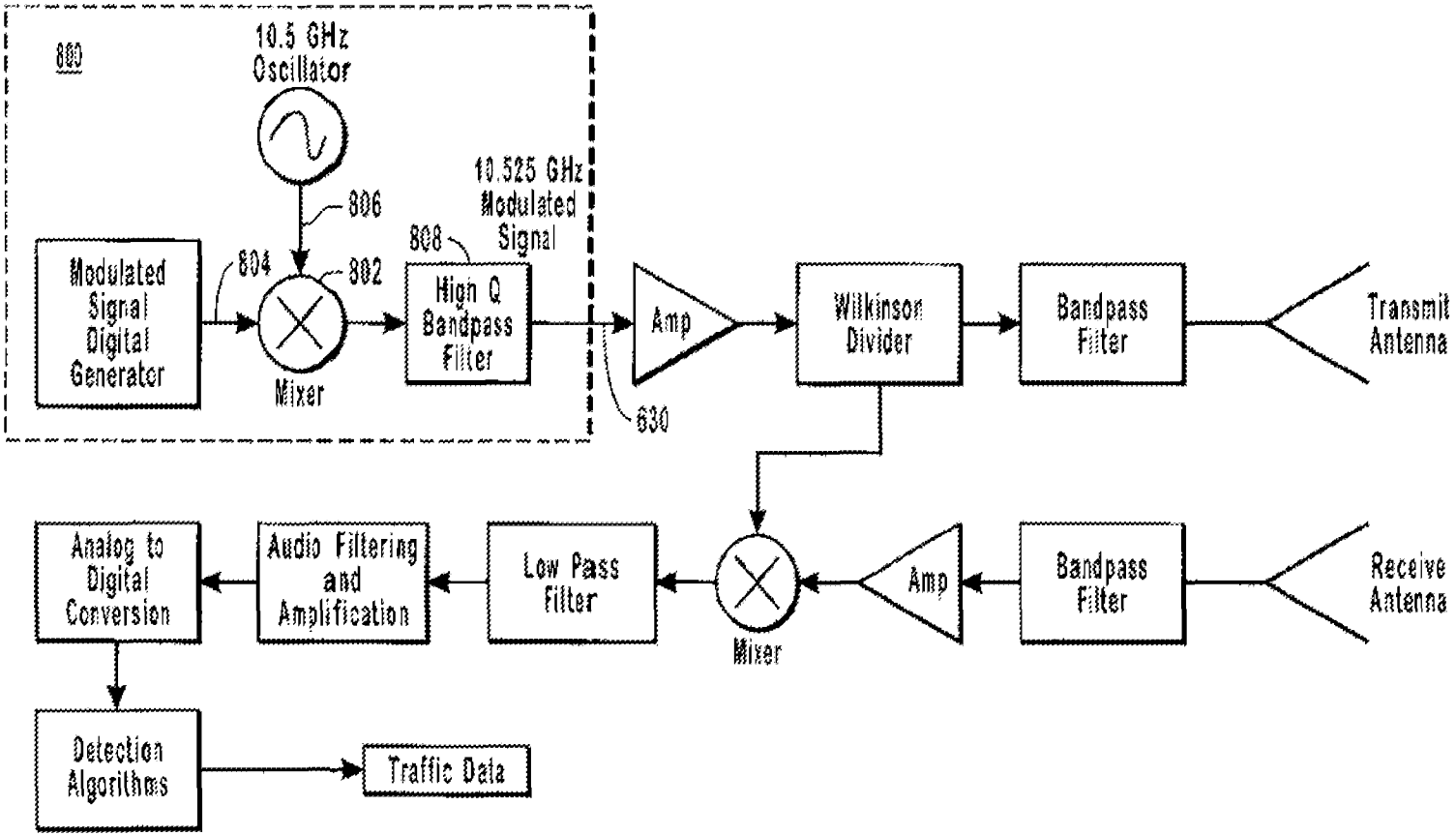
FIG. 11 illustrates an embodiment employing a mixer configuration for the digitally generated modulated signal generator, in accordance with an embodiment of the present invention; [and]

FIG. 11 illustrates another digitally generated modulated signal generator 800. This embodiment illustrates up-converting a digitally generated modulated signal by using a frequency mixer 802. In this approach, the modulated signal 804 is mixed with an RF tone 806 resulting in a signal containing frequencies of the sum and difference of the tone and the original signal. Only the sum or the difference frequencies are desired and one or the other must be filtered out by a filter 808. For example, the digitally modulated signal generator produces a signal ranging from 100 MHz to 150 MHz. This signal is then mixed with a 10.4 GHz tone. The resulting signal contains copies of the digitally generated modulated signal in the 10.3 GHz to 10.25 GHz range and in the 10.5 to 10.55 GHz ranges. A band pass filter 808 with a high Q can be used to filter the lower frequency copy and the higher frequency copy is then transmitted.

Figure 12:
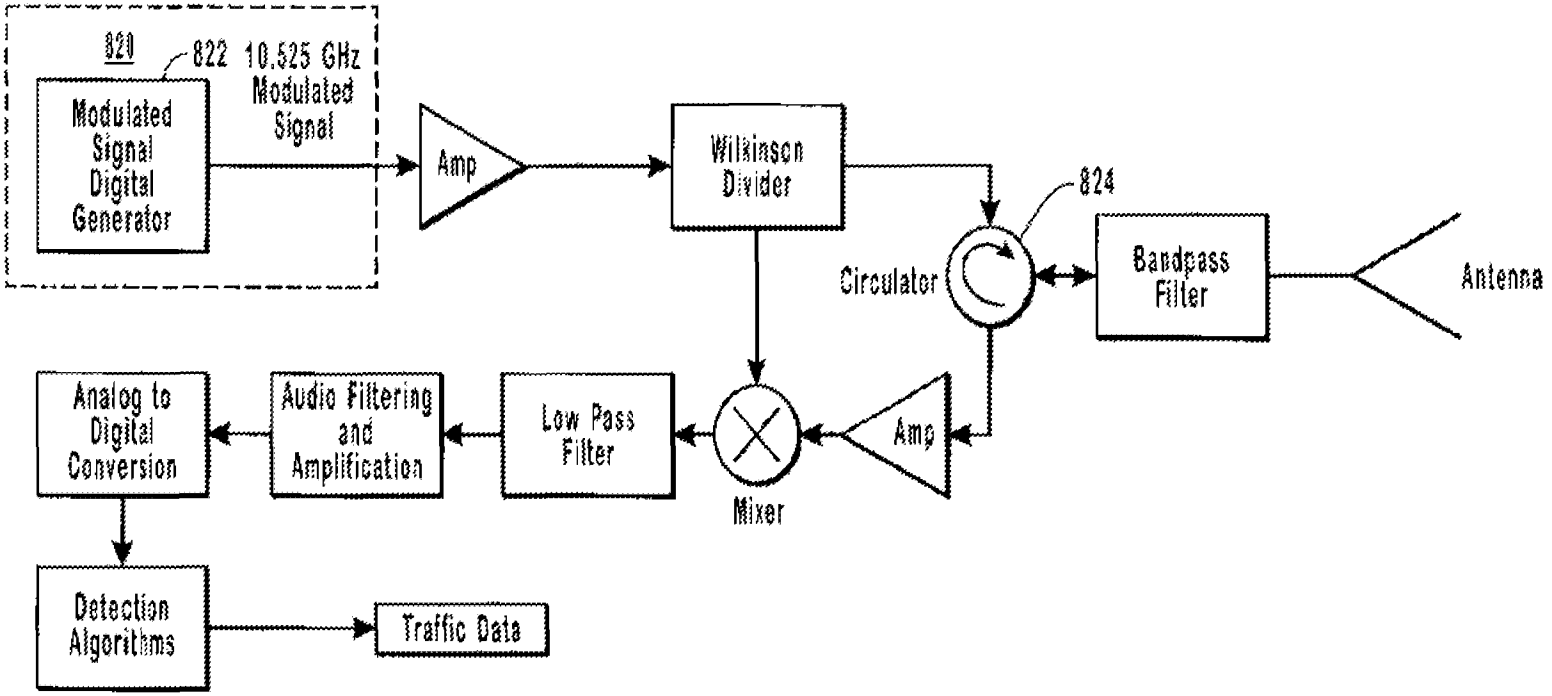
FIG. 12 illustrates direct digital signal generation of the transmit signal, in accordance with another embodiment of the present invention*;*

FIG. 12 illustrates a specific embodiment for digitally generating a modulated signal wherein the digitally generated modulated signal generator 820 is comprised of a direct digital to analog conversion generator 822 capable of direct generation of the desired signal. FIG. 12 further illustrates another implementation of the transmit and [receiver] *receive* portions wherein they share a single antenna that is multiplexed using a circulator 824 for alternating between transmit and receive modes of operation.

Each of these embodiments comprises similar additional components and the preferred embodiment, as illustrated in FIG. 8 is used to describe and define those components. In the preferred embodiment as illustrated in FIG. 8, reference signal 612 sweeps in frequency from 10.5 megahertz to 10.55 megahertz and is generally linear with a duration of 1.25 milliseconds followed by recovery time.

The output of DDS 606 couples to a phase lock loop 608 which operates by comparing two input frequencies 612, 614 and generates a voltage 616 which controls a voltage controlled oscillator (VCO) 610. Regarding phase lock loop 608, if the reference signal 612 is lower in frequency than the pre-scaler output 614, then the output voltage 616 of phase lock loop 608 becomes lowered. Conversely, if reference signal 612 is higher than pre-scaler output 614, then output voltage 616 of phase lock loop 608 is increased.

VCO 610 outputs a signal 618 whose frequency is determined by the input voltage 616. Those of skill in the art appreciate that the higher the input voltage of input 616, the higher the frequency of the RF signal output 618, and conversely, the lower input voltage 616, the lower the frequency of the RF output signal 618. In a "reverse" drive VCO, a change in input voltage yields the opposite result of that just described. By way of example and not limitation, the VCO 610 of the present embodiment generates an output signal in the 5.25 GHz to 5.275 GHz range.

Transmit portion 602 is further comprised of a pre-scaler 620 which operates as a frequency divider by reducing the frequency of VCO 610 by a factor of, for example, 4. Before comparing the two signals, the PLL further divides the signal by a factor of 250 which results in a signal in the 10.5 MHz to 10.55 MHz range, which range is near the same frequency as reference signal 612 as output by DDS 606. Thus, output signals 612, from the direct digital synthesizer and pre-scaler output 614 become tracking signals for comparison by phase lock loop 608. In general, phase lock loop 608 adjusts input voltage 616 to VCO 610 until both inputs, reference signal 612 and pre-scaler output 614, are at the same frequency. As referenced signal 612 from DDS 606 increases in frequency, phase lock loop 608 drives VCO 610 in such a manner as to also increase the frequency. Thus, output signal 618 from VCO 610 results in the same signal as reference signal 612 other than signal 618 is scaled, in the present example, by a factor of 500.

Transmitter portion 602 further includes a Wilkinson divider 622 for dividing the RF signal 618 into two paths while maintaining isolation between the two outputs, output 624 and output 626. Those of skill in the art appreciate that Wilkinson divider 622 is a splitter in which each output path is reduced by half, or 3 dB, from input signal 618.

Transmitter portion 602 further includes a doubler 628 for receiving signal 624 and generating a signal 630. Doubler 628 operates as a nonlinear device for effectively doubling the frequency from input signal 624 to output signal 630. In the present example, input signal 624 operates between 5.25 GHz and 5.275 GHz generating an output 630 ranging from 10.5 GHz to 10.55 GHz. Therefore, signal 630, in the present example, results in a multiplication of reference signal 612 by a factor of 1,000.

Transmitter portion 602 further includes an amplifier 632 for coupling with signal 630 and for generating signal 634. Amplifier 632 provides gain control of the signal for boosting the signal to a level sufficiently large for transmission. Amplifier 632 further couples to a Wilkinson divider 636 for partitioning a portion of the transmission power to the [receiver] *receive* portion through a signal 638 and Wilkinson divider 636 further generates an output 640 for passing to band pass filter 642. Those of skill in the art appreciate that that pass band filter 642 filters the output signal on the transmit portion to reduce transmissions outside of the desired frequency band. Transmit portion 602 further includes a transmit antenna 644 further described below for emanating the signals generated by the aforementioned circuitry.

Received portion 604 is comprised of various components for receiving reflected signals as emanated by transmit portion 602. Reflected signals are received by receive antenna 650 and processed by a bandpass filter 652 which reduces transmission outside of the desired frequency band. The receive filtered signal 654 is thereafter passed to amplifier 656 which generally is implemented as a low noise amplifier for boosting the received signal to a more useable level for processing.

Amplified signal 658 and signal 638 are received by mixer 660 which, in the present example, is implemented as a nonlinear device that effectively multiplies the two input signals to produce output signal 662. Those of skill in the art appreciate that mixers operate, for example, by receiving two sinusoidal signals which may be of different frequencies which results in an output signal having the characteristics of the sum of the two input sinusoidal signals, which trigonometrically results in a first frequency corresponding to the sum of the two input frequencies and a second frequency corresponding to the difference of the two input frequencies. This principle is illustrated by the trigonometric identity:

$$\sin\alpha\cos\beta=\tfrac{1}{2}[\sin(\alpha-\beta)+\sin(\alpha+\beta)]$$

Thus, if one input signal is 10.5 GHz and a second is 10.50001 GHz then the output signal from the mixer will be the sum of the sinusoids at 21.00001 GHz and another at 10 KHz for the present exemplary implementation, the resulting difference frequency signal is employed for evaluation of the signal characteristics.

It should be appreciated that the utilization of the difference frequency is a result of ranging capabilities of a linearly sweeping transmitted frequency. For example, the present embodiment utilizes a signal transmitted that is linearly frequency modulated (e.g. chirp). If the transmitted signal is reflected by a single point source target and is received by the radar and mixed with the same linearly modulated signal, the received signal, which has been delayed in time by the propagation duration to and from the target results in a frequency difference between the two inputs to the mixer since the transmitted signal exhibits a constantly increasing frequency during the phase of the period under evaluation. Therefore, the longer the propagation time to and from the target in question, the larger the frequency difference between the presently transmitted and the received signal. For example, in the present illustration, the linearly increasing frequency increases at a rate of 50 MHz in 1.25 milliseconds. Such a linear change in frequency results in a 40 GHz per second change in frequency. Therefore, if a target is located at a distance of 100 feet, the propagation time to and from the target is approximately 203 nanoseconds. In that length of time, the transmit frequency would have changed by 8.13 KHz.

Received portion 604 is further comprised of a low pass filter 664 which eliminates undesired RF signals from the mixer output, therefore resulting in audio frequencies being present at signal 666. Therefore, signal 666, which is the output of the low pass filter 664, is an audio frequency signal whose frequency corresponds to the range of the target and whose amplitude corresponds to the reflectiveness of the target.

[Receiver] *Receive* portion 604 further includes audio filtering and amplification as illustrated in block 668. Such filtering and amplification conditions the signal prior to digitization to reduce any feed-through from the transmitting antenna directly coupling to the receiving antenna. Signal conditioning in the form of high pass filtering is employed since transmitter coupling appears in the received signal as a low frequency.

The following digital circuitry components may reside on a separate digital board. The output condition signal 670 is input to analog-to-digital conversion for 672, which converts the audio frequency signal to a digital signal for processing and analysis. The digitized output signal 674 is thereafter processed by detection algorithm 676, which performs spectral analysis on the digitized signal 674 and generates the desired traffic statistics for use in traffic analysis, control, and forecasting. Other processing within detection algorithm 676 includes automatic and continuous background estimation, automatic and continuous lane allocation and automatic and continuous detection threshold determination.

Figure 9:
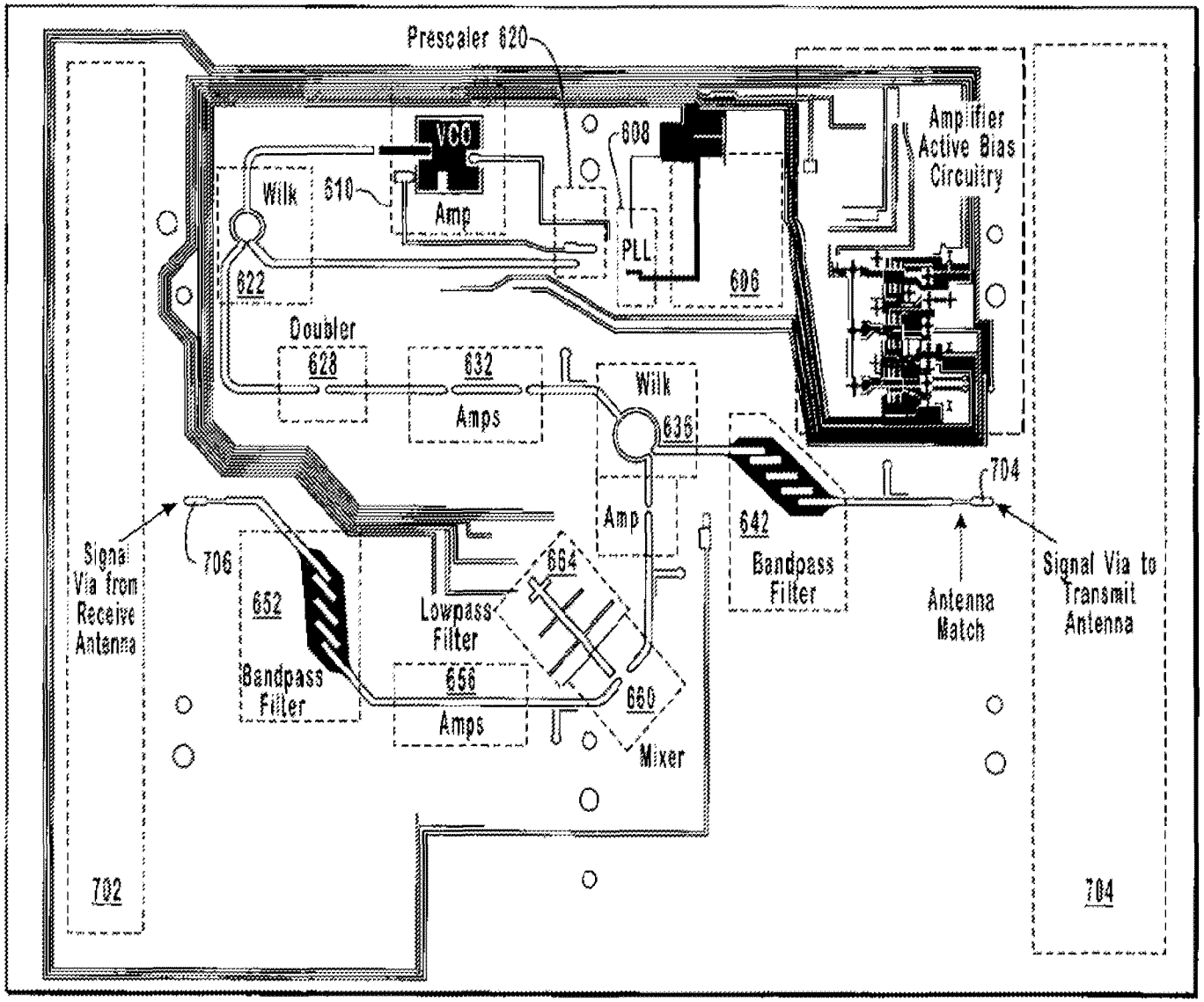
FIG. 9 is a detailed layout of the RF component side of the RF component side of the RF board, in accordance with the preferred embodiment of the present invention.

FIG. 9 illustrates a typical layout of the RF component side of the RF circuit board, in accordance with the preferred embodiment of the present invention. As discussed, RF components 522 (FIG. 5) are populated on side 524. The transmit portion 602 and receive portion 604 are depicted, absent antennas 570 and 572 which populate the other side of the board. The conductor backed dielectric substrates 704 and 702 for the antenna structures are depicted in FIG. 9. Also depicted in FIG. 9 are the signal via to the transmit antenna 704 and the signal via from the receive antenna 706.

*In at least one embodiment, a traffic system sensor detects vehicles passing within the field of view and processes the data into an estimation of the position of each of the detected vehicles. A traffic monitoring system employs the traffic system sensor for monitoring traffic conditions about a roadway or intersection. As roadways exhibit traffic movement in various directions and across various lanes, the sensor detects vehicles passing through a field of view. The sensor data is input into a Fourier transform algorithm to convert from the time domain signal into the frequency domain. Each of the transform bins exhibits the respective energies with ranging being proportional to the frequency. A detection threshold discriminates between vehicles and other reflections.*

*In at least one embodiment, a vehicle position is estimated as the bin in which the peak of the transform is located. A detection count is maintained for each bin and contributes to the probability density function estimation of vehicle position. The probability density function describes the probability that a vehicle will be located at any range. The peaks of the probability function represent the center of each lane and the valleys of the probability density function represent the lane boundaries. The boundaries are then represented with each lane being defined by multiple range bins with each range bin representing a slightly different position on the corresponding lane of the road. Traffic flow direction is also assigned to each lane based upon tracking of the transform phase while the vehicle is in the radar beam.*

*Returning to FIG. 1, FIG. 1 illustrates a traffic monitoring system 100 which provides a method and system for dynamically defining the position or location of traffic lanes to the traffic monitoring system such that counts of actual vehicles may be appropriately assigned to a traffic lane counter that is representative of actual vehicular traffic in a specific lane. In FIG. 1, traffic monitoring system 100 is depicted as being comprised of a sensor 110 mounted on a mast or pole 112 in a side-fire or perpendicular orientation to the direction of traffic. Sensor 110 transmits and receives an electromagnetic signal across a field of view 114. Preferably, the field of view 114 is sufficiently broad in angle so as to span the entire space of traffic lanes of concern. As further described below, sensor 110 transmits an electromagnetic wave of a known power level across the field of view 114. Subsequent to the transmission of an electromagnetic wave front across a roadway 116, reflected signals at a reflected power level are reflected, depicted as reflected waves 118 having a reflected power, back to a receiver within sensor 110. The reflected waves 118 are thereafter processed by sensor 110 to determine and dynamically define the respective roadway lanes, according to processing methods described below.*

*FIG. 13 is a block diagram of the functional components of a traffic monitoring system, in accordance with the preferred embodiment of the present invention. Traffic monitoring system 1300 is depicted as being comprised of a sensor 110 which is illustrated as being comprised of a transceiver 1302 which is further comprised of a transmitter 1304 and a receiver 1306. Transmitter 1304 transmits an electromagnetic signal of a known power level toward traffic lanes 120-128 (FIG. 1) across a field of view 114 (FIG. 1). Receiver 1306 receives a reflected power corresponding to a portion of the electromagnetic signal as reflected from each of the vehicles passing therethrough. Transmitter 1304 and receiver 1305 operate in concert with processor 1308 to transmit the electromagnetic signal of a known power and measure a reflected power corresponding to the presence of vehicles passing therethrough. Processor 1308 makes the processed data available to other elements of a traffic monitoring system such as a traffic controller system 1310 and traffic management system 1312.*

*In at least one embodiment, to determine direction of travel automatically, the radar is preferably not mounted precisely perpendicular to the road. It is mounted off perpendicular, pointing slightly into the direction of travel of the nearest lane (to the left if standing behind the radar facing the road) by a few degrees. The vehicle direction of travel is determined by tracking the Fourier transform phase while the vehicle is in the radar beam. Many measurements are made while the car is in the radar beam. After the car has left the beam, the consecutive phase measurements are phase unwrapped to produce a curve that is approximately quadratic in shape and shows evidence of vehicle travel direction.*

*A vehicle entering the radar beam from the left will produce a curve similar to curve 1440 of FIG. 14 with the left end of the curve being higher than the right end. This occurs because with the radar turned a few degrees the vehicle spends more time, while in the radar beam, approaching the radar sensor than leaving the sensor. Likewise, a vehicle entering from the right will produce a curve as in curve 1450 of FIG. 14 with the right end of the curve being higher than the left. Once the direction of travel is known, the vehicle position and lane boundaries are used to determine which lane the vehicle is in. The direction of traffic flow can then be estimated by using the direction PDF estimates to determine which direction of flow is most probable in each lane.*

*FIG. 15 depicts a side-fired deployment of a sensor 110, in accordance with the present invention. While sensors may be deployed in a number of setups, one preferred implementation is a side fire or perpendicular configuration. In FIG. 15, a roadside sensor 110 is depicted as having a field of view 114 spread across multiple lanes of traffic. In the preferred embodiment, the field of view is partitioned into a plurality of bins 1500, each of which represents a distance or range such that a lane may be comprised of a plurality of bins which provide us a smaller and more improved granularity of statistical bins into which specific position may be allocated.*

*After processing the received signal, the signal reflected off the vehicles is assigned to a bin having the corresponding reflected signal parameters and shows up as an energy measurement in the range bin representing the vehicle's position. The number of vehicles in each bin is counted with the count incremented when an additional vehicle is detected the count and assigned to that bin. When a bin count is incremented, it increases the probability of a car being in that position and after many vehicle positions are recorded, a histogram of the bin count represents a PDF of vehicle position on the road. The histogram of position measurements identifies where vehicles are most probable to be and where the traffic lanes on the roadway should be defined. In*

*the present figure, lanes derive their specific lane positions by setting the lane boundaries between the peaks according to detection theory.*

*Alternative ways of automatically assigning lane boundaries may be used but are simplifications or subsets of using PDF estimates and decision theory to set the boundaries. For a method to automatically assign lane boundaries it must have a period of training where it gathers information about vehicle position on the road and this collection of position information over time is more or less the histogram explained above. Decision theory will be used in determining lane boundaries and can vary according to desired performance. The preferred embodiment of the present invention employs statistical processing in order to determine and dynamically track the placement of lanes. While the present invention depicts a preferred statistical implementation, those of skill in the art appreciate that other statistical approaches may also be employed for dynamically defining traffic lanes.*

*In at least one embodiment, if vehicle position statistics change over time due to weather, road construction, or other disturbances the lane position algorithms have the ability to update lane boundaries. One example would be to have the current set of statistics averaged into the past statistics with a small weight given to older position statistics and greater weight to more recent statistics. Thus, if conditions change the overall statistics will change to reflect the current situation in an amount of time dictated by how much the current set of data is weighted.*

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensor for monitoring vehicles on a roadway comprising:

a multi-layer radio frequency circuit board for transmitting modulated radio frequency signals and for receiving reflections of the modulated radio frequency signals from said vehicles on said roadway, said multi-layer radio frequency circuit board having a first side for disposing radio frequency components thereon and a second side having a planar antenna disposed thereon, wherein the radio frequency components include a digital signal generator that digitally generates the modulated radio frequency signals; and at least one signal processing circuit board having a first side for disposing signal processing components thereon and a second side having an electrically conductive ground layer, said second side of said at least one signal processing board oriented in parallel with and facing said multi-layer radio frequency circuit board.

2. The sensor, as recited in claim 1, wherein said planar antenna comprises a plurality of series-configured loop elements arranged in a tapered array.

3. The sensor, as recited in claim 2, wherein said planar antenna comprises at least a pair of tapered arrays.

4. The sensor as recited in claim 1, wherein said digital signal generator further comprises a direct digital synthesizer for generating a low frequency waveform for a transmitter of said sensor.

5. The sensor, as recited in claim 1, further comprising:

an RF absorber assembled between said first side of said radio frequency circuit board having said radio frequency components thereon and said second side of said at least one signal processing board having said electrically conductive ground layer thereon.

6. The sensor, as recited in claim 1, further comprising a housing for enclosing said multi-layer radio frequency circuit board and said at least one signal processing board therein.

7. The sensor, as recited in claim 6, wherein said housing for enclosing said multi-layer radio frequency circuit board and said at least one signal processing board therein is configured as a planar housing surrounding said multi-layer radio frequency circuit board and said at least one signal processing board therein.

8. The sensor, as recited in claim 7, wherein said planar housing further comprises a radome integrated into said planar housing and located adjacent to said planar antenna on said radio frequency circuit board.

[~~9. An above-ground traffic sensor for detecting vehicles traveling on a roadway, the traffic sensor comprising:~~

~~a radio frequency circuit board including:~~

~~a transmit portion that includes:~~

~~a digitally generated modulated signal generator that digitally generates a signal that is transmitted by a transmitter towards vehicles traveling on a roadway; and~~

~~a receiver portion that detects a reflected signal from the vehicles traveling on the roadway and that generates a data signal that represents traffic data from the reflected signal.~~]

[~~10. The above-ground traffic sensor, as recited in claim 9, wherein said digitally generated modulated signal generator comprises:~~

~~a direct digital synthesizer for generating a low frequency waveform for said transmitter;~~

~~a phase lock loop coupled to said direct digital synthesizer for tracking said low frequency waveform; and~~

~~a voltage controlled oscillator coupled to said phase lock loop for generating a modulated transmit signal.~~]

11. [The above-ground traffic sensor, as recited in claim 9, wherein said digitally generated modulated signal generator comprises] *An above-ground traffic sensor for detecting vehicles traveling on a roadway, the traffic sensor comprising*:

*a radio frequency circuit board including:*

*a transmit portion that includes:*

*a digitally generated modulated signal generator that digitally generates a signal that is transmitted by a transmitter towards vehicles traveling on a roadway;*

*a receiver portion that detects a reflected signal from the vehicles traveling on the roadway and that generates a data signal that represents traffic data from the reflected signal;* a digitally modulated signal generator for generating a modulated signal;

an oscillator for generating an RF tone; and a frequency mixer for mixing said modulated signal and said RF tone to form a signal [comprises] *comprised* of sum and difference frequencies.

[~~12. The above-ground traffic sensor, as recited in claim 9, wherein said digitally generated modulated signal generator comprises:~~

~~a direct digital to analog converter for directly generating a modulated signal at RF frequencies.~~]

[~~13. The above-ground traffic sensor, as recited in claim 9, wherein said radio frequency circuit board further comprises a planar antenna disposed thereon for transmitting said signal and for receiving reflections of said signal.~~]

14. [The above-ground traffic sensor, as recited in claim 13] *An above-ground traffic sensor for detecting vehicles traveling on a roadway, the traffic sensor comprising:*

*a radio frequency circuit board including:*

*a transmit portion that includes:*

*a digitally generated modulated signal generator that digitally generates a signal that is transmitted by a transmitter towards vehicles traveling on a roadway;*

*a receiver portion that detects a reflected signal from the vehicles traveling on the roadway and that generates a data signal that represents traffic data from the reflected signal;*

*wherein said radio frequency circuit board further comprises a planar antenna disposed thereon for transmitting said signal and for receiving reflections of said signal, and* wherein said planar antenna comprises of a plurality of series-configured loop elements arranged in a tapered array.

15. [The above-ground traffic sensor, as recited in claim 14,] *An above-ground traffic sensor for detecting vehicles traveling on a roadway, the traffic sensor comprising:*

*a radio frequency circuit board including:*

*a transmit portion that includes:*

*a digitally generated modulated signal generator that digitally generates a signal that is transmitted by a transmitter towards vehicles traveling on a roadway; and*

*a receiver portion that detects a reflected signal from the vehicles traveling on the roadway and that generates a data signal that represents traffic data from the reflected signal;*

*wherein said radio frequency circuit board further comprises a planar antenna disposed thereon for transmitting said signal and for receiving reflections of said signal,*

*wherein said planar antenna comprises a plurality of series-configured loop elements arranged in a tapered array; and* wherein said planar antenna comprises at least a pair of said tapered arrays.

[16. An above-ground traffic sensor for detecting vehicles traveling on a roadway, comprising:

planar antennas mounted in a planar circuit board for propagating a transmit signal toward vehicles on a roadway and for receiving said transmit signal reflected from said vehicles, wherein the planar antennas further comprises:

at least one coplanar loop series-fed array antenna on the planar circuit board.]

[17. The above-ground traffic sensor, as recited in claim 16, wherein said at least one coplanar loop series-fed antenna comprises:

a first coplanar loop series-fed array antenna that propagates said transmit signal toward said vehicles on said roadway; and a second coplanar loop series-fed array antenna that receives said transmit signal reflected from said vehicle.]

18. [The above-ground traffic sensor, as recited in claim 17,] *An above-ground traffic sensor for detecting vehicles traveling on a roadway, comprising:*

*planar antennas mounted in a planar circuit board for propagating a transmit signal toward vehicles on a roadway and for receiving said transmit signal reflected from said vehicles, wherein the planar antennas further comprise:*

*at least one coplanar loop series-fed array antenna on the planar circuit board, wherein said at least one coplanar loop series-fed antenna comprises:*

*a first coplanar loop series-fed array antenna that propagates said transmit signal toward said vehicles on said roadway;*

*a second coplanar loop series-fed array antenna that receives said transmit signal reflected from said vehicle; and* wherein said first coplanar loop series-fed array antenna and said second coplanar loop series-fed array antenna include loop elements arranged in tapered arrays.

19. [The above-ground traffic sensor, as recited in claim 17,] *An above-ground traffic sensor for detecting vehicles traveling on a roadway, comprising:*

*planar antennas mounted in a planar circuit board for propagating a transmit signal toward vehicles on a roadway and for receiving said transmit signal reflected from said vehicles, wherein the planar antennas further comprise:*

*at least one coplanar loop series-fed array antenna on the planar circuit board, wherein said at least one coplanar loop series-fed antenna comprises:*

*a first coplanar loop series-fed array antenna that propagates said transmit signal toward said vehicles on said roadway;*

*a second coplanar loop series-fed array antenna that receives said transmit signal reflected from said vehicle; and* wherein said at least one coplanar loop series-fed array antenna each comprises at least a pair of tapered arrays.

20. A radar-based vehicular traffic sensor, comprising:

a digital signal generator that digitally generates a modulated electromagnetic signal;

transmitter electronic components for transmitting the modulated electromagnetic signal at a vehicle on a roadway;

receiver electronic components for receiving the modulated electromagnetic signal reflected from the vehicle on the roadway; and at least one planar loop series-fed array antenna for transmission and/or reception of said modulated electromagnetic signal, wherein each at least one planar loop series-fed array antenna includes a plurality of loops, each loop having a height that is different from other loops in the plurality of loops.

21. A radar-based vehicular traffic sensor, as recited in claim 20, wherein the digital signal generator further comprises one or more of:

a direct digital synthesizer that generates a modulated electromagnetic signal that sweeps in frequency; and a modulated signal digital generator for generating a modulated electromagnetic signal that is up converted using a frequency mixer.

[~~22. A sensor for monitoring vehicles on a roadway, the sensor comprising:~~

~~a transmit portion comprising:~~

~~a digital signal generator that digitally generates a modulated signal; and~~

~~a transmit antenna for transmitting the modulated signal towards vehicles on a roadway;~~

~~a received portion comprising:~~

~~a receive antenna for receiving reflections of the modulated signal from vehicles on the roadway, wherein the reflections of the modulated signal are processed to produce traffic data representing the vehicles on the roadway.~~]

[~~23. A sensor as defined in claim 22, wherein the transmit antenna and the receive antenna are the same antenna used at different times to either transmit the modulated signal or to receive the reflections of the modulated signal.~~]

[24. A sensor as defined in claim 22, wherein the transmit antenna is a first array of series fed coplanar loop elements and wherein the receive antenna is a second array of series fed coplanar loop elements.]

[~~25. A sensor as defined in claim 22, wherein the digital signal generator further comprises at least one of:~~

~~a direct digital synthesizer that is coupled with a phase locked loop;~~

~~a modulated signal digital generator and an up-converter; and~~

~~a direct digital-to-analog conversion generator that produces the modulate signal.~~]

26. An above-ground traffic sensor for detecting vehicles traveling on a roadway, comprising:

planar antennas mounted in a planar circuit board for propagating said a transmit signal toward said vehicles on said a roadway and for receiving said transmit signal reflected from said vehicles, wherein the planar antennas further comprises:

at least one coplanar loop series-fed array antenna on the planar circuit board, wherein each at least one coplanar loop series-fed array antenna is terminated by a short circuited transmission line.

27. The above-ground traffic sensor, as recited in claim 26, wherein each coplanar loop series-fed array antenna includes a tapered array that includes a plurality of loops, wherein the plurality of loops are configured to generate a radiation pattern with low side lobes.

*28. An above-ground traffic sensor for detecting vehicles traveling on a roadway, the traffic sensor comprising:*

*a radio frequency circuit board comprising:*

*a transmit portion that includes:*

*a digitally generated modulated signal generator that digitally generates and digitally modulates a signal that is transmitted by a transmitter towards vehicles traveling on a roadway;*

*a single receive portion that detects reflections of the signal from the vehicles traveling on the roadway and that generates, with a digital circuit that is integrated within the single receive portion, a data signal that represents traffic data from the reflected signal; and*

*wherein the traffic data is generated by the digital circuit that processes the reflections of the signal detected by the single receive portion to generate the traffic data about substantially all vehicles on the roadway on a lane-by-lane basis with respect to at least two different lanes on a fixed portion of the roadway and wherein the traffic data is used in traffic control at a controlled signalized intersection.*

*29. The above-ground traffic sensor, as recited in claim 28, wherein said digitally generated modulated signal generator comprises:*

*a direct digital synthesizer for generating a low frequency waveform for said transmitter;*

*a phase lock loop coupled to said direct digital synthesizer for tracking said low frequency waveform; and*

*a voltage controlled oscillator coupled to said phase lock loop for generating a modulated transmit signal.*

*30. The above-ground traffic sensor, as recited in claim 28, wherein said digitally generated modulated signal generator comprises:*

*a direct digital to analog converter for directly generating a modulated signal at RF frequencies.*

*31. The above-ground traffic sensor, as recited in claim 28, wherein said radio frequency circuit board further comprises a planar antenna disposed thereon for transmitting said signal and for receiving the reflections of the signal.*

*32. The above-ground traffic sensor, as recited in claim 28, wherein the traffic data comprises a volume of vehicles on the roadway.*

*33. The above-ground traffic sensor, as recited in claim 32, wherein the volume of vehicles on the roadway is determined with respect to a fixed portion of the roadway.*

*34. The above-ground traffic sensor, as recited in claim 32, wherein the volume of vehicles on the roadway is determined on a lane-by-lane basis with respect to at least two different lanes on a fixed portion of the roadway.*

*35. The above-ground traffic sensor, as recited in claim 32, wherein the traffic data is generated by the above-ground traffic sensor that is mounted to a fixed object adjacent to the roadway.*

*36. The above-ground traffic sensor, as recited in claim 28, wherein the traffic data comprises an occupancy of vehicles on the roadway.*

*37. The above-ground traffic sensor, as recited in claim 36, wherein the occupancy of vehicles on the roadway is determined with respect to a fixed portion of the roadway.*

*38. The above-ground traffic sensor, as recited in claim 36, wherein the occupancy of vehicles on the roadway is determined on a lane-by-lane basis with respect to at least two different lanes on a fixed portion of the roadway.*

*39. The above-ground traffic sensor, as recited in claim 36, wherein the traffic data is generated by the above-ground traffic sensor that is mounted to a fixed object adjacent to the roadway.*

*40. The above-ground traffic sensor, as recited in claim 28, wherein the traffic data comprises a range and speed of substantially all vehicles on the roadway.*

*41. The above-ground traffic sensor, as recited in claim 40, wherein the range and speed of substantially all vehicles on the roadway is determined with respect to a fixed portion of the roadway.*

*42. The above-ground traffic sensor, as recited in claim 40, wherein the range and speed of substantially all vehicles on the roadway is determined on a lane-by-lane basis with respect to at least two different lanes on a fixed portion of the roadway.*

*43. The above-ground traffic sensor, as recited in claim 40, wherein the traffic data is generated by the above-ground traffic sensor that is mounted to a fixed object adjacent to the roadway.*

*44. The above-ground traffic sensor, as recited in claim 28, wherein the traffic data comprises a dynamic updating of the traffic data for substantially all vehicles on the roadway.*

*45. The above-ground traffic sensor, as recited in claim 44, wherein the dynamic updating of the traffic data for substantially all vehicles on the roadway is determined with respect to a fixed portion of the roadway.*

*46. The above-ground traffic sensor, as recited in claim 44, wherein the dynamic updating of the traffic data for substantially all vehicles on the roadway is determined on a lane-by-lane basis with respect to at least two different lanes on a fixed portion of the roadway.*

*47. The above-ground traffic sensor, as recited in claim 44, wherein the traffic data is generated by the above-ground traffic sensor that is mounted to a fixed object adjacent to the roadway.*

*48. The above-ground traffic sensor, as recited in claim 28, wherein the traffic data comprises a dynamic updating of a density of vehicles on the roadway.*

*49. The above-ground traffic sensor, as recited in claim 48, wherein the dynamic updating of a density of vehicles on the roadway is determined with respect to a fixed portion of the roadway.*

*50. The above-ground traffic sensor, as recited in claim 48, wherein the dynamic updating of a density of vehicles on the roadway is determined on a lane-by-lane basis with respect to at least two different lanes on a fixed portion of the roadway.*

*51. The above-ground traffic sensor, as recited in claim 48, wherein the traffic data is generated by the above-ground traffic sensor that is mounted to a fixed object adjacent to the roadway.*

*52. The above-ground traffic sensor, as recited in claim 28, wherein the traffic data comprises a direction of vehicle travel with respect to a fixed portion of the roadway.*

*53. The above-ground traffic sensor, as recited in claim 28, wherein the traffic sensor is mounted off-perpendicular with respect to the roadway.*

*54. The above-ground traffic sensor, as recited in claim 28, wherein said radio frequency circuit board comprises a printed circuit board.*

*55. An above-ground traffic sensor for monitoring vehicles on a roadway, the sensor comprising:*

*a transmit portion comprising:*

*a digital signal generator that digitally generates a modulated signal; and*

*a transmit antenna for transmitting the modulated signal towards vehicles on a roadway;*

*a receive portion comprising:*

*a receive antenna for receiving reflections of the modulated signal from the vehicles on the roadway, wherein the reflections of the modulated signal are processed to produce traffic data representing the vehicles on the roadway; and*

*wherein a digital circuit processes the reflections of the modulated signal to generate the traffic data such that the traffic data includes information separately identifying at least two vehicles that are traveling in adjacent lanes.*

*56. The above-ground traffic sensor, as recited in claim 55, wherein the traffic data comprises a volume of vehicles on the roadway.*

*57. The above-ground traffic sensor, as recited in claim 56, wherein the volume of vehicles on the roadway is determined with respect to a fixed portion of the roadway.*

*58. The above-ground traffic sensor, as recited in claim 56, wherein the volume of vehicles on the roadway is determined on a lane-by-lane basis with respect to at least two different lanes on a fixed portion of the roadway.*

*59. The above-ground traffic sensor, as recited in claim 56, wherein the traffic data is generated by the above-ground traffic sensor that is mounted to a fixed object adjacent to the roadway.*

*60. The above-ground traffic sensor, as recited in claim 55, wherein the traffic data comprises an occupancy of vehicles on the roadway.*

*61. The above-ground traffic sensor, as recited in claim 60, wherein the occupancy of vehicles on the roadway is determined with respect to a fixed portion of the roadway.*

*62. The above-ground traffic sensor, as recited in claim 60, wherein the occupancy of vehicles on the roadway is determined on a lane-by-lane basis with respect to at least two different lanes on a fixed portion of the roadway.*

*63. The above-ground traffic sensor, as recited in claim 60, wherein the traffic data is generated by the above-ground traffic sensor that is mounted to a fixed object adjacent to the roadway.*

*64. The above-ground traffic sensor, as recited in claim 55, wherein the traffic data comprises a range and speed of substantially all vehicles on the roadway.*

*65. The above-ground traffic sensor, as recited in claim 64, wherein the range and speed of substantially all vehicles on the roadway is determined with respect to a fixed portion of the roadway.*

*66. The above-ground traffic sensor, as recited in claim 64, wherein the range and speed of substantially all vehicles on the roadway is determined on a lane-by-lane basis with respect to at least two different lanes on a fixed portion of the roadway.*

*67. The above-ground traffic sensor, as recited in claim 64, wherein the traffic data is generated by the above-ground traffic sensor that is mounted to a fixed object adjacent to the roadway.*

*68. The above-ground traffic sensor, as recited in claim 55, wherein the traffic data comprises a dynamic updating of the traffic data of substantially all vehicles on the roadway.*

*69. The above-ground traffic sensor, as recited in claim 68, wherein the dynamic updating of the traffic data of substantially all vehicles on the roadway is determined with respect to a fixed portion of the roadway.*

*70. The above-ground traffic sensor, as recited in claim 68, wherein the dynamic updating of the traffic data of substantially all vehicles on the roadway is determined on a lane-by-lane basis with respect to at least two different lanes on a fixed portion of the roadway.*

*71. The above-ground traffic sensor, as recited in claim 68, wherein the traffic data is generated by the above-ground traffic sensor that is mounted to a fixed object adjacent to the roadway.*

*72. The above-ground traffic sensor, as recited in claim 55, wherein the traffic data comprises a dynamic updating of a density of vehicles on the roadway.*

*73. The above-ground traffic sensor, as recited in claim 72, wherein the dynamic updating of a density of vehicles on the roadway is determined with respect to a fixed portion of the roadway.*

*74. The above-ground traffic sensor, as recited in claim 72, wherein the dynamic updating of a density of vehicles on the roadway is determined on a lane-by-lane basis with respect to at least two different lanes on a fixed portion of the roadway.*

*75. The above-ground traffic sensor, as recited in claim 72, wherein the traffic data is generated by the above-ground traffic sensor that is mounted to a fixed object adjacent to the roadway.*

*76. The above-ground traffic sensor, as recited in claim 55, wherein the traffic data comprises a direction of vehicle travel with respect to a fixed portion of the roadway.*

*77. The above-ground traffic sensor, as recited in claim 55, wherein the traffic sensor is mounted off-perpendicular with respect to the roadway.*

*78. The above-ground traffic sensor, as recited in claim 55, wherein the transmit portion comprises a printed circuit board.*

*79. An above-ground traffic sensor for detecting vehicles traveling on a fixed portion of a roadway, the traffic sensor comprising:*

*a radio frequency circuit board comprising:*

*a transmit portion that includes:*

*a digitally generated modulated signal generator that digitally generates a signal that is transmitted by a transmitter towards vehicles traveling on the fixed portion of the roadway;*

*a receive portion that detects reflections of the signal from the vehicles traveling on the fixed portion of the roadway and a digital circuit that processes the reflected signals and generates a data signal that represents traffic data from the reflected signal,*

*wherein the traffic data represents information about vehicles on a lane-by-lane basis with respect to at least two different, dynamically-defined lanes on the fixed portion of the roadway.*

*80. The above-ground traffic sensor, as recited in claim 79, wherein the traffic data comprises one or more of a volume of vehicles on the fixed portion of the roadway, an occupancy of vehicles on the fixed portion of the roadway, or a range and speed of substantially all vehicles on the fixed portion of the roadway.*

*81. The above-ground traffic sensor, as recited in claim 80, wherein the traffic data is generated by the above-ground traffic sensor that is mounted to a fixed object adjacent to the fixed portion of the roadway.*

*82. The above-ground traffic sensor, as recited in claim 80, wherein the signal that is transmitted by the transmitter is transmitted at a known power level across multiple lanes of traffic on the fixed portion of the roadway and the signal is reflected at a reflected power level that is received by the receive portion.*

* * * * *